United States Patent
Larkin et al.

(10) Patent No.: US 12,038,980 B2
(45) Date of Patent: Jul. 16, 2024

(54) MACHINE LEARNING TECHNIQUES FOR GENERATING STRING-BASED DATABASE MAPPING PREDICTION

(71) Applicant: Optum Services (Ireland) Limited, Dublin (IE)

(72) Inventors: Kevin Larkin, Maynooth (IE); Nancy N. Flores, Hagerstown, MD (US); Conor M. McDermott, Lifford (IE); Colum Foley, Balbriggan (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 17/816,189

(22) Filed: Jul. 29, 2022

(65) Prior Publication Data

US 2023/0057414 A1    Feb. 23, 2023

Related U.S. Application Data

(60) Provisional application No. 63/235,246, filed on Aug. 20, 2021.

(51) Int. Cl.
| | |
|---|---|
| *G06F 16/903* | (2019.01) |
| *G06F 16/2458* | (2019.01) |
| *G06N 7/01* | (2023.01) |

(52) U.S. Cl.
CPC .... *G06F 16/90344* (2019.01); *G06F 16/2468* (2019.01); *G06N 7/01* (2023.01)

(58) Field of Classification Search
CPC .......... G06F 16/90344; G06F 16/2468; G06F 16/215; G06F 18/214; G06F 16/313; G06F 18/22; G06F 18/29; G06F 16/25; G06N 7/01; G06N 3/043; G06N 3/047; G06N 5/02; G06N 5/047; G06N 7/023; G06N 7/02; G06N 5/025; G16H 50/70
(Continued)

(56) References Cited

U.S. PATENT DOCUMENTS

| | | |
|---|---|---|
| 8,255,205 B2 | 8/2012 | Hogan et al. |
| 8,527,522 B2 | 9/2013 | Baron et al. |

(Continued)

FOREIGN PATENT DOCUMENTS

| | | |
|---|---|---|
| CN | 112765318 A | 5/2021 |
| WO | 2021/096690 A1 | 5/2021 |

OTHER PUBLICATIONS

"CyberSource Medical," SourceForge, (Year: 2022), (3 pages), available online at https://sourceforge.net/software/product/CyberSource-ComCom-Systems/.
(Continued)

*Primary Examiner* — Evan Aspinwall
(74) *Attorney, Agent, or Firm* — ALSTON & BIRD LLP

(57) ABSTRACT

Various embodiments of the present invention provide methods, apparatus, systems, computing devices, computing entities, and/or the like for performing predictive mapping operations with respect to a ground-truth database table. Certain embodiments of the present invention utilize systems, methods, and computer program products that perform predictive mapping operations utilizing a hierarchical string matching machine learning framework using at least one or more of an exact match model, a probabilistic match model, a disjoint match model, and an embedding-based match model.

20 Claims, 12 Drawing Sheets

(58) Field of Classification Search
USPC .......................................................... 707/780
See application file for complete search history.

(56) References Cited

U.S. PATENT DOCUMENTS

| | | | |
|---|---|---|---|
| 8,745,077 | B2 | 6/2014 | Huang |
| 8,793,199 | B2 | 7/2014 | Syeda-Mahmood et al. |
| 9,264,387 | B2 | 2/2016 | Scholtes et al. |
| 10,255,270 | B2 | 4/2019 | Cook et al. |
| 11,152,084 | B2 | 10/2021 | Kondadadi et al. |
| 11,182,395 | B2 | 11/2021 | Mirylenka et al. |
| 2009/0222395 | A1 | 9/2009 | Light et al. |
| 2012/0278263 | A1* | 11/2012 | Borthwick ............. G06N 20/00 706/12 |
| 2014/0052688 | A1 | 2/2014 | Bansal |
| 2014/0229462 | A1* | 8/2014 | Lo .......................... G06F 16/951 707/707 |
| 2016/0180245 | A1* | 6/2016 | Tereshkov ............. G06N 20/00 706/12 |
| 2018/0307946 | A1* | 10/2018 | Kuroda ................... G06F 16/48 |
| 2019/0303371 | A1* | 10/2019 | Rowe ................. G06F 16/24564 |
| 2020/0210466 | A1* | 7/2020 | Yin ........................ G06F 16/313 |
| 2020/0272845 | A1* | 8/2020 | He ..................... G06F 18/24133 |
| 2021/0272038 | A1 | 9/2021 | Kowolenko et al. |
| 2021/0373510 | A1* | 12/2021 | Borah .................... G05B 15/02 |
| 2022/0019738 | A1 | 1/2022 | Narulkar et al. |

OTHER PUBLICATIONS

"Facebook Research/Faiss Wiki," GitHub, (5 pages), (online), [Retrieved from the Internet Sep. 1, 2022] <URL: https://github.com/facebookresearch/faiss/wiki>.

"WANTED: New Answer to Growing COB Problem," MultiPlan, Apr. 29, 2021, (7 pages), (article, online), [Retrieved from the Internet Apr. 1, 2022] <URL: https://www.multiplan.us/wanted-new-answer-to-growing-cob-problem/>.

"Welcome to Faiss Documentation," (3 pages), [Retrieved from the Internet Sep. 1, 2022] <URL: https://faiss.ai/>.

Gschwind, Thomas et al. "Fast Record Linkage for Company Entities," arXiv preprint arXiv:1907.08667v3 [cs.DB], Sep. 27, 2019, (15 pages), available online at https://arxiv.org/pdf/1907.08667.pdf.

Sun, Xu et al. "Feature-Frequency-Adaptive On-Line Training for Fast and Accurate Natural Language Processing," Computational Linguistics, vol. 40, No. 3, Sep. 1, 2014, pp. 563-586, DOI: 10.1162/COLL_a_00193.

Wen, Zeyi et al. "A Technical Report: Entity Extraction Using Both Character-Based and Token-Based Similarity," arXiv preprint arXiv:1702.03519v1 [cs.DB] Feb. 12, 2017, (12 pages), available online at https://arxiv.org/pdf/1702.03519.pdf.

* cited by examiner

402

701 Perform a required number of exact match iterations to generate an exact match determination for the input string with respect to one or more exact target strings utilizing the one or more exact match models of the hierarchical string matching learning framework

702 In response to determining that each exact match model of the hierarchical string matching learning framework is associated with a negative exact match model determination with respect to the input string, perform a required number of probabilistic match iterations to generate a probabilistic match determination for the input string with respect to one or more probabilistic target strings utilizing one or more probabilistic match models of the hierarchical string matching learning framework

703 In response to determining that each probabilistic match model of the hierarchical string matching learning framework is associated with a negative probabilistic match determination with respect to the input string, generate a disjoint match determination with respect to the input string utilizing a disjoint match model of the hierarchical string machine learning framework

704 In response to determining that disjoint match model of the hierarchical string matching learning framework is associated with a negative disjoint match model determination with respect to the input string, generate an embedding-based match determination with respect to the input string utilizing an embedding-based match model of the hierarchical string machine learning framework

```
┌─────────────────────────────────────────────────┐
│ Retrieve a probabilistic match rules file associated with the │
│ probabilistic match model comprising one or more probabilistic │
│              target strings                     │
│                    901                          │
└─────────────────────────────────────────────────┘
                        ↓
┌─────────────────────────────────────────────────┐
│ For each probabilistic target string, generate a respective │
│ pairwise fuzzy match score with respect to the input string. │
│                    902                          │
└─────────────────────────────────────────────────┘
                        ↓
┌─────────────────────────────────────────────────┐
│ Determine whether at least one respective pairwise fuzzy match │
│ score satisfies the optimized probabilistic match threshold for │
│         the probabilistic match model           │
│                    903                          │
└─────────────────────────────────────────────────┘
                        ↓
┌─────────────────────────────────────────────────┐
│ In response to determining that at least one respective pairwise │
│ fuzzy match score satisfies the optimized probabilistic match │
│ threshold for the probabilistic match model, generate an │
│     affirmative probabilistic match determination │
│                    904                          │
└─────────────────────────────────────────────────┘
```

Input String: bcbs payer    1202

| Carrier Type 1204 | Carrier API 1206 | Other Insurance carrier 1208 | Confidence score 1210 |
|---|---|---|---|
| Commercial | Premera Blue Cross Blue Shield Alaska | bcps pa | 0.823 |

FIG. 12

MACHINE LEARNING TECHNIQUES FOR GENERATING STRING-BASED DATABASE MAPPING PREDICTION

CROSS-REFERENCE TO RELATED APPLICATIONS

This application claims the benefit of and priority to U.S. Provisional Application Ser. No. 63/235,246, filed on Aug. 20, 2021, which is incorporated by reference herein in its entirety.

BACKGROUND

Various embodiments of the present invention address technical challenges related to performing database mapping predictions based at least in part on an input string and disclose innovative techniques for efficiently and effectively performing database mapping predictions based at least in part on an input string.

BRIEF SUMMARY

In general, various embodiments of the present invention provide methods, apparatus, systems, computing devices, computing entities, and/or the like for performing database mapping prediction with respect to a ground-truth database table and utilizing a hierarchical string matching machine learning framework. Certain embodiments of the present invention utilize systems, methods, and computer program products that perform database mapping prediction with respect to a ground-truth table by utilizing at least one of input string, exact match models, probabilistic match models, disjoint match models, and embedding-based match models.

In accordance with one aspect, a method is provided. In one embodiment, the method comprises: generating, using a hierarchical string matching machine learning framework, and based at least in part on the input string, the database mapping prediction, wherein: the hierarchical string matching machine learning framework comprises a group of table-independent match models and a plurality of table-dependent match models, the group of table-independent match models comprise a plurality of exact match models and a plurality of probabilistic match models, the plurality of table-dependent match models comprise a disjoint match model and an embedding-based match model, each table-independent match model is associated with a respective mapping label of a plurality of defined mapping labels, each exact match model is configured to: (i) retrieve an exact match rules file associated with the exact match model that describes one or more exact target strings for the exact match model, (ii) determine whether the input string exactly matches one of the one or more exact target strings, and (iii) in response to determining that the input string exactly matches one of the one or more exact target strings: (a) generating a selected mapping label for the input string based at least in part on the respective mapping label for the exact match model, and (b) generating an affirmative exact match determination, each probabilistic match model is configured to, in response to determining that each exact match model is associated with a negative exact match determination: (i) retrieve a probabilistic match rules file associated with the probabilistic match model that describes: (a) one or more probabilistic target strings for the probabilistic match model, and (b) an optimized probabilistic match threshold for the probabilistic match model, (ii) for each probabilistic target string, generating a respective pairwise fuzzy match score with respect to the input string, (iii) determining whether at least one respective pairwise fuzzy match score satisfies the optimized probabilistic match threshold for the probabilistic match model, and (iv) in response to determining that at least one respective pairwise fuzzy match score satisfies the optimized probabilistic match threshold for the probabilistic match model: (a) generating the selected mapping label for the input string based at least in part on the respective mapping label for the probabilistic match model, and (b) generating an affirmative probabilistic match determination, the disjoint match model is configured to, in response to determining that each probabilistic match model is associated with a negative probabilistic match determination: (i) determining whether the token count of the input string satisfies a token count threshold, and (ii) in response to determining that the token count of the input string satisfies the token count threshold, performing a required number of row-wise token match determination iterations until an earlier-satisfied condition of: (a) reaching a qualifying row-wise token match determination iteration that is associated with a qualifying row-wise string whose qualifying token match score with respect to the input string satisfies a qualifying token match score threshold, or (b) reaching a final row-wise token match determination iteration that is associated with a final row-wise string of the group of row-wise strings, wherein: (i) each ith row-wise token match determination iteration is associated with an ith row-wise string of the group of row-wise strings that is selected in accordance with a row order for the group of ground-truth database table rows, and (ii) in response to reaching the qualifying row-wise token match determination iteration, the selected mapping label for the input string is generated based at least in part on a row-wise mapping label for the qualifying row-wise string and an affirmative disjoint match determination is generated, the embedding-based match model is configured to, in response to determining that the disjoint match model is associated with a negative disjoint match determination: (i) generate, based at least in part on an input string embedding vector for the input string and a group of row-wise string embedding vectors for the group of row-wise strings, a defined-size subset of highest-likelihood matched row-wise strings in the group of row-wise strings, (ii) for each row-wise string in the defined-size subset, generating a corresponding pairwise fuzzy match score with respect to the input string, and (iii) in response to determining that at least one corresponding pairwise fuzzy match score satisfies a pairwise fuzzy match score threshold: (a) generating the selected mapping label for the input string based at least in part on the row-wise mapping label for the row-wise string in the defined-size subset that is associated with a highest corresponding pairwise fuzzy match, and (b) generating an affirmative embedding-based match determination, and the database mapping prediction is generated based at least in part on at least one of the selected mapping label for the input string or a negative embedding-based match determination; and performing one or more prediction-based actions based at least in part on the database mapping prediction.

In accordance with another aspect, a computer program product is provided. The computer program product may comprise at least one computer-readable storage medium having computer-readable program code portions stored therein, the computer-readable program code portions comprising executable portions configured to: generate, using a hierarchical string matching machine learning framework, and based at least in part on the input string, the database mapping prediction, wherein: the hierarchical string matching machine learning framework comprises a group of table-independent match models and a plurality of table-dependent match models, the group of table-independent match models comprise a plurality of exact match models and a plurality of probabilistic match models, the plurality of table-dependent match models comprise a disjoint match model and an embedding-based match model, each table-independent match model is associated with a respective mapping label of a plurality of defined mapping labels, each exact match model is configured to: (i) retrieve an exact match rules file associated with the exact match model that describes one or more exact target strings for the exact match model, (ii) determine whether the input string exactly matches one of the one or more exact target strings, and (iii) in response to determining that the input string exactly matches one of the one or more exact target strings: (a) generating a selected mapping label for the input string based at least in part on the respective mapping label for the exact match model, and (b) generating an affirmative exact match determination, each probabilistic match model is configured to, in response to determining that each exact match model is associated with a negative exact match determination: (i) retrieve a probabilistic match rules file associated with the probabilistic match model that describes: (a) one or more probabilistic target strings for the probabilistic match model, and (b) an optimized probabilistic match threshold for the probabilistic match model, (ii) for each probabilistic target string, generating a respective pairwise fuzzy match score with respect to the input string, (iii) determining whether at least one respective pairwise fuzzy match score satisfies the optimized probabilistic match threshold for the probabilistic match model, and (iv) in response to determining that at least one respective pairwise fuzzy match score satisfies the optimized probabilistic match threshold for the probabilistic match model: (a) generating the selected mapping label for the input string based at least in part on the respective mapping label for the probabilistic match model, and (b) generating an affirmative probabilistic match determination, the disjoint match model is configured to, in response to determining that each probabilistic match model is associated with a negative probabilistic match determination: (i) determining whether the token count of the input string satisfies a token count threshold, and (ii) in response to determining that the token count of the input string satisfies the token count threshold, performing a required number of row-wise token match determination iterations until an earlier-satisfied condition of: (a) reaching a qualifying row-wise token match determination iteration that is associated with a qualifying row-wise string whose qualifying token match score with respect to the input string satisfies a qualifying token match score threshold, or (b) reaching a final row-wise token match determination iteration that is associated with a final row-wise string of the group of row-wise strings, wherein: (i) each ith row-wise token match determination iteration is associated with an ith row-wise string of the group of row-wise strings that is selected in accordance with a row order for the group of ground-truth database table rows, and (ii) in response to reaching the qualifying row-wise token match determination iteration, the selected mapping label for the input string is generated based at least in part on a row-wise mapping label for the qualifying row-wise string and an affirmative disjoint match determination is generated, the embedding-based match model is configured to, in response to determining that the disjoint match model is associated with a negative disjoint match determination: (i) generate, based at least in part on an input string embedding vector for the input string and a group of row-wise string embedding vectors for the group of row-wise strings, a defined-size subset of highest-likelihood matched row-wise strings in the group of row-wise strings, (ii) for each row-wise string in the defined-size subset, generating a corresponding pairwise fuzzy match score with respect to the input string, and (iii) in response to determining that at least one corresponding pairwise fuzzy match score satisfies a pairwise fuzzy match score threshold: (a) generating the selected mapping label for the input string based at least in part on the row-wise mapping label for the row-wise string in the defined-size subset that is associated with a highest corresponding pairwise fuzzy match, and (b) generating an affirmative embedding-based match determination, and the database mapping prediction is generated based at least in part on at least one of the selected mapping label for the input string or a negative embedding-based match determination; and perform one or more prediction-based actions based at least in part on the database mapping prediction.

In accordance with yet another aspect, an apparatus comprising at least one processor and at least one memory including computer program code is provided. In one embodiment, the at least one memory and the computer program code may be configured to, with the processor, cause the apparatus to: generate, using a hierarchical string matching machine learning framework, and based at least in part on the input string, the database mapping prediction, wherein: the hierarchical string matching machine learning framework comprises a group of table-independent match models and a plurality of table-dependent match models, the group of table-independent match models comprise a plurality of exact match models and a plurality of probabilistic match models, the plurality of table-dependent match models comprise a disjoint match model and an embedding-based match model, each table-independent match model is associated with a respective mapping label of a plurality of defined mapping labels, each exact match model is configured to: (i) retrieve an exact match rules file associated with the exact match model that describes one or more exact target strings for the exact match model, (ii) determine whether the input string exactly matches one of the one or more exact target strings, and (iii) in response to determining that the input string exactly matches one of the one or more exact target strings: (a) generating a selected mapping label for the input string based at least in part on the respective mapping label for the exact match model, and (b) generating an affirmative exact match determination, each probabilistic match model is configured to, in response to determining that each exact match model is associated with a negative exact match determination: (i) retrieve a probabilistic match rules file associated with the probabilistic match model that describes: (a) one or more probabilistic target strings for the probabilistic match model, and (b) an optimized probabilistic match threshold for the probabilistic match model, (ii) for each probabilistic target string, generating a respective pairwise fuzzy match score with respect to the input string, (iii) determining whether at least one respective pairwise fuzzy match score satisfies the optimized probabilistic match threshold for the probabilistic match model, and (iv) in response to determining that at least one respective pairwise fuzzy match score satisfies the optimized probabilistic match threshold for the probabilistic match model: (a) generating the selected mapping label for the input string based at least in part on the respective mapping label for the probabilistic match model, and (b) generating an affirmative probabilistic match determination, the disjoint match model is configured to, in response to determining that each probabilistic match model is associated with a negative probabilistic match determination: (i) determining whether the token count of the input string satisfies a token count threshold, and (ii) in response to determining that the token count of the input string satisfies the token count threshold, performing a required number of row-wise token match determination iterations until an earlier-satisfied condition of: (a) reaching a qualifying row-wise token match determination iteration that is associated with a qualifying row-wise string whose qualifying token match score with respect to the input string satisfies a qualifying token match score threshold, or (b) reaching a final row-wise token match determination iteration that is associated with a final row-wise string of the group of row-wise strings, wherein: (i) each ith row-wise token match determination iteration is associated with an ith row-wise string of the group of row-wise strings that is selected in accordance with a row order for the group of ground-truth database table rows, and (ii) in response to reaching the qualifying row-wise token match determination iteration, the selected mapping label for the input string is generated based at least in part on a row-wise mapping label for the qualifying row-wise string and an affirmative disjoint match determination is generated, the embedding-based match model is configured to, in response to determining that the disjoint match model is associated with a negative disjoint match determination: (i) generate, based at least in part on an input string embedding vector for the input string and a group of row-wise string embedding vectors for the group of row-wise strings, a defined-size subset of highest-likelihood matched row-wise strings in the group of row-wise strings, (ii) for each row-wise string in the defined-size subset, generating a corresponding pairwise fuzzy match score with respect to the input string, and (iii) in response to determining that at least one corresponding pairwise fuzzy match score satisfies a pairwise fuzzy match score threshold: (a) generating the selected mapping label for the input string based at least in part on the row-wise mapping label for the row-wise string in the defined-size subset that is associated with a highest corresponding pairwise fuzzy match, and (b) generating an affirmative embedding-based match determination, and the database mapping prediction is generated based at least in part on at least one of the selected mapping label for the input string or a negative embedding-based match determination; and perform one or more prediction-based actions based at least in part on the database mapping prediction.

BRIEF DESCRIPTION OF THE SEVERAL VIEWS OF THE DRAWINGS

Reference will now be made to the accompanying drawings, which are not necessarily drawn to scale, and wherein:

FIG. 7 provides a flowchart diagram of an example process for generating a database mapping prediction for an input string with respect to a ground-truth database table in accordance with some embodiments discussed herein.

FIG. 9 provides a flowchart diagram of an example process for performing a probabilistic match model iteration in accordance with some embodiments discussed herein.

FIG. 12 provides an operational example of a prediction output user interface in accordance with some embodiments discussed herein.

DETAILED DESCRIPTION

Figure 1:
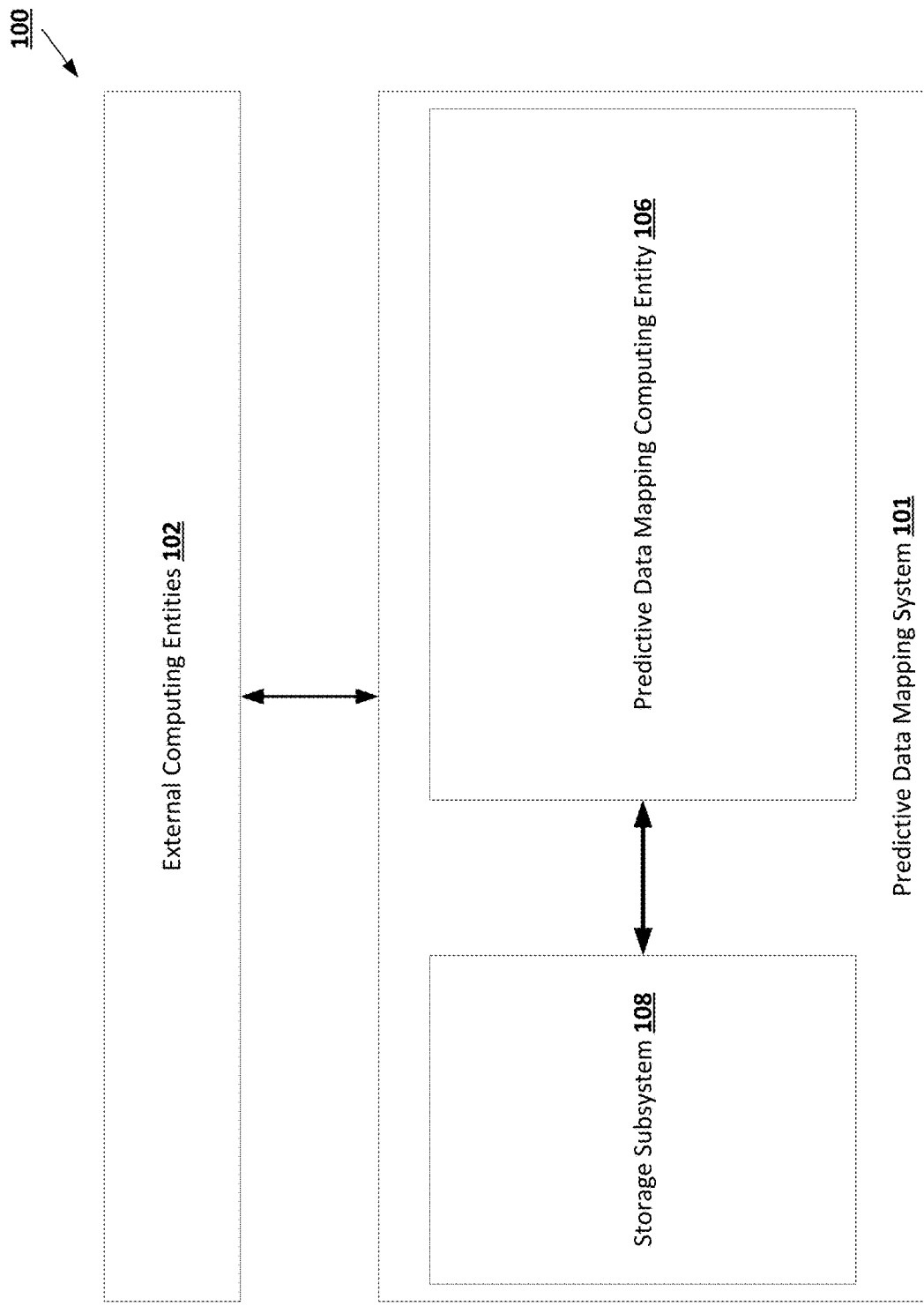
FIG. 1 provides an exemplary overview of an architecture that can be used to practice embodiments of the present invention.

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to database mapping prediction with respect to coordination of benefits (COB), one of ordinary skill in the art will recognize that the disclosed concepts can be used to perform other types of predictive database mapping.

I. Overview and Technical Advantages

Various embodiments of the present disclosure make important technical contributions to improving predictive accuracy of string-based machine learning models by introducing innovative machine learning techniques that enable using trained models in combination with rule-based techniques in a manner that is configured to improve training speed and training efficiency of string-based machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, the techniques described herein improve predictive accuracy without harming training speed, such as various techniques described herein, enable improving training speed given a constant predictive accuracy. In doing so, the techniques described herein improve accuracy, efficiency, and speed of machine learning models, thus reducing the number of computational operations needed and/or the amount of training data entries needed to train string-based machine learning models. Accordingly, the techniques described herein improve at least one of the computational efficiency, storage-wise efficiency, and speed of training machine learning models.

Moreover, various embodiments of the present invention improve computational efficiency of performing string-based machine learning models by introducing techniques that limit the use of trained string-input machine learning models to instances where less computationally-expensive rule-based model operations fail to generate a satisfactory match. For example, various embodiments of the present invention introduce a hierarchical string matching machine learning framework that comprises a group of table-independent match models and a plurality of table-dependent match models, where the group of table-independent match models comprise a plurality of exact match models and a plurality of probabilistic match models, the plurality of table-dependent match models comprises a disjoint match model and an embedding-based match model, and each table-independent match model is associated with a respective mapping label of a plurality of defined mapping labels, each probabilistic match model is triggered in response to determining that each exact match model is associated with a negative exact match determination, the disjoint match model is triggered in response to determining that each probabilistic match model is associated with a negative probabilistic match determination, and the embedding-based match model (which in some embodiments is the component that uses one or more machine learning operations) is triggered in response to determining that the disjoint match model is associated with a negative disjoint match determination. In this way, the noted embodiments of the present invention limit the use of trained string-input machine learning models to instances where less computationally-expensive rule-based model operations fail to generate a satisfactory match, an approach that in turn improves computational efficiency of performing string-based machine learning models.

Various embodiments of the present invention make important technical contributions to improving resource-usage efficiency of post-prediction systems by using string-based prediction outputs to set the number of allowed computing entities used by the noted post-prediction systems and thus perform operational load balancing for the post-prediction systems (e.g., for investigation systems that use string-based prediction outputs as inputs to their investigative operations). For example, in some embodiments, a predictive data analysis computing entity (e.g., predictive data mapping computing entity) determines D string-based predicted scores for the D input strings. Then, the count of D input strings, along with a resource utilization ratio for each input string, can be used to predict a number of computing entities needed to perform post-prediction processing operations (e.g., automated investigation operations) with respect to the D input strings. For example, in some embodiments, the number of computing entities needed to perform post-prediction processing operations (e.g., automated investigation operations) with respect to D input strings can be determined based at least in part on the output of the equation: $R = \text{ceil}(\Sigma_k^{k=K} ur_k)$, where R is the predicted number of computing entities needed to perform post-prediction processing operations with respect to the D input strings, ceil(.) is a ceiling function that returns the closest integer that is greater than or equal to the value provided as the input parameter of the ceiling function, k is an index variable that iterates over K input strings among the D input strings that are associated with the highest predicted scores, and $ur_k$ is the estimated resource utilization ratio for a kth input string. In some embodiments, once R is generated, a predictive data analysis computing entity (e.g., predictive data mapping computing entity) can use R to perform operational load balancing for a server system that is configured to perform post-prediction processing operations (e.g., investigation operations) with respect to D input strings. This may be done by allocating computing entities to the post-prediction processing operations if the number of currently-allocated computing entities is below R, and deallocating currently-allocated computing entities if the number of currently-allocated computing entities is above R.

Various embodiments of the present invention relate to handling variations of freely-defined names that refer to the same entity (e.g., an insurance carrier). In particular, various embodiments of the present invention involve processing and matching free-text insurance carrier name variations to ground-truth carrier names and providing the matched carrier names to automated processes, such as coordination of benefits (COB) and payment processing. A key benefit of various embodiments of the present invention is the full automation of a previously manual process with high accuracy, thereby resulting in improved efficiency in COB system throughput and cost savings over manual alternatives.

According to various embodiments of the present invention, the following operations are performed: generating a ground-truth reference data object comprising a plurality of historical name variations each associated with a ground-truth entity class, where each historical name variation that is associated with a commercial ground-truth entity class is paired with a ground-truth entity name and is further associated with an API look up action; receiving a free-text entity name; identifying a subset of historical name variations that match the free-text entity name using the Facebook AI Similarity Search (FAISS) fast indexing library; selecting a final historical name variation from the subset of historical name variations based at least in part on generating a similarity score for each of the subset of historical name variations; and if the ground-truth entity class associated with the final historical name variation is the commercial ground-truth entity class, performing the API look up action associated with the final historical name variation and provide the ground-truth entity name paired to the final historical name variation to a post-matching system to represent the received free-text entity name.

In some embodiments, in order to consistently handle free-text entity names and name variations that refer to the same entity, a common reference or ground-truth name for the entity is defined through a ground-truth reference data object. In various examples, various and inconsistent name variations referring to one entity may be unrecognizable by various automated systems, and such automated systems may prefer one consistent ground-truth name for the one entity. In some embodiments, the ground-truth reference data object includes a plurality of ground-truth entity names each associated with an entity and each serving as the one consistent name to be used in future processing for the associated entity.

In some embodiments, the ground-truth reference data object may be generated by a team of subject matter experts having deep domain knowledge of the entities identified by the free-text names and name variations. First, historical free-text records having multiple name variations are obtained. Next, each name variation is matched against a set of defined ground-truth entity names using standard fuzzy matching logic. A configurable input file that defines certain rules and logic may be used to augment the fuzzy matching. Then, the matching is verified by the team of subject matter experts, who then finalize a ground-truth reference data object that pairs each free-text name variation (found in the historical records) to a ground-truth entity name.

In some embodiments the team of subject matter experts further assigns each pair of the ground-truth reference data object with a categorical label, such as an entity type. In the example of the above figure, each pair is labeled with a plan type that describes a benefit coordination type. This entity type label is configured to be recognized by post-matching systems and to instruct certain actions to be performed by the post-matching systems. In some embodiments, with the ground-truth reference data object being generated, the proposed system is equipped with a reference or lookup that can be used for new incoming free-text carrier names.

In some embodiments, a free-text entity name is received, and the free-text entity name may have been extracted from a claim that requires processing. For instance, the claim may require coordination of benefits processing, and the free-text entity name may be received to be matched with a ground-truth entity name recognizable by a system configured for coordination of benefits processing (e.g., a post-matching system). In some examples then, the free-text entity name may be received in a matching query.

In some embodiments, with the received free-text entity name requiring matching to a ground-truth name that is recognizable by a post-matching system, the received free-text entity name is compared with name variations in the ground-truth reference data object. In some examples, the ground-truth reference data object may be fairly large, and thus, efficient search methodologies are used to find a subset of name variations most similar to the received free-text entity name. In some embodiments, the Facebook AI Similarity Search (FAISS) fast indexing library is used to efficiently find the top N closest matches in the ground-truth reference data object.

In some embodiments, each historical name variation in the top N closest matching historical name variations, or the subset, is then assigned a similarity score with respect to the free-text entity name. The historical name variation in the subset that has the highest similarity score is deemed the final historical name variation, or the historical name variation that best matches the received free-text entity name.

In some embodiments, a hierarchical fuzzy match is performed such that, before performing any fuzzy matching operations followed by similarity score determinations operations, the free-text entity name is processed using a set of filters to determine if the free-text entity matches any of those filters. In some embodiments, if the free-text entity name matches a filter, that filter is used to determine the final historical name variation without generating any related historical name variation subset for the free-text entity name and/or performing any filtering of the related subset based at least in part on similarity scores. For example, in some embodiments, the following operations may be performed: converting the free-text entity name to string and lowercasing it; performing an exact match filtering for the string against a rules file to exclude non-entity-name-suggesting strings; performing an exact match filtering for covid-related strings to match covid-related strings to a covid match category; performing an exact match filtering for Medicare/Medicaid-related strings to match Medicare/Medicaid-related strings to a Medicare/Medicaid match category; performing an exact match filtering for marketplace-related strings to match marketplace-related strings to a marketplace match category; performing a string size length to exclude strings with less than three tokens; performing matching operations in relation to the first two non-stop-word tokens of a string against a ground-truth reference data object to return exact match strings; and if all of the above filtering operations fail, performing fuzzy matching and similarity determination with respect to the string.

In some examples, the final historical name variation is associated with the commercial ground-truth entity class, and thus is associated with a ground-truth entity name and an API lookup action. Accordingly, the ground-truth entity name is then taken to represent the entity identified by the received free-text entity name. Thus, for example, this paired ground-truth entity name is a "cleansed" version of the received free-text entity name.

Additionally the API lookup action that is associated with the final historical name variation can be performed. In various examples, the ground-truth entity name is also provided to various robotic agents and APIs for automated processing, where the ground-truth entity name is recognizable (in contrast to the received free-text entity name). The label associated with the final historical name variation may additionally be provided to the various robotic agents and APIs to cause certain processing actions.

In some embodiments, a proposed system is configured to: (i) generate a ground-truth reference data object comprising a plurality of historical name variations each paired with a ground-truth entity name, a ground-truth entity class, and a label identifying an automated action, where each historical name variation that is associated with a commercial ground-truth entity class is associated with an application programming interface (API) look up action, (ii) receive a free-text entity name, (iii) perform a set of hierarchical fuzzy match operations using the ground-truth reference data object to identify a historical name variation for the free-text entity name, and (v) if the ground-truth entity class for the final historical name variation is the commercial ground-truth entity class, perform an API look operation to map the ground-truth entity name associated with the final historical name variation to ground-truth entity data and provide the ground-truth entity data to a post-matching system to represent the received free-text entity name.

II. Definitions of Certain Terms

The term "input string" may refer to information/data with respect to which one or more predictive tasks/operations are performed to generate a database mapping prediction with respect to a ground-truth database table. The input string may be a word string (e.g., a sequence of words). In some embodiments, examples of input strings include freely-defined names that refer to the same entity (e.g., an insurance carrier). For example, in some embodiments, an input string may be a freely-defined healthcare insurance carrier name variation, where healthcare insurance carrier name variations describe freely-defined names that refer to the same healthcare insurance carrier. Examples of healthcare insurance carriers (also referred to as insurance carriers) include commercial healthcare insurance companies, government programs such as Medicare and Medicaid, and/or the like. For example, consider where "Blue shield of California Out of State" and "Blue shield of California Out of State" each refer to the same insurance carrier (e.g., entity), each carrier name variation may be an input string with respect to which one or more predictive tasks/operations are performed to generate a database mapping prediction (e.g., based at least in part on carrier name variation).

As noted above, in some embodiments, the input string may be represented and/or presented as free-text data (e.g., unstructured data, semi-structured data, and/or a combination thereof). For example, in some embodiments, the input string may be free-text insurance carrier name variation that is extracted from a healthcare insurance claims form (HICF), Explanation of Benefits (EOB) statements and/or other healthcare related documents. In some embodiments, the input string may be provided as input to a hierarchical string matching machine learning framework to generate predicted ground-truth data for the input string. In some embodiments, the predicted ground-truth data may include a mapping label (e.g., selected mapping label) and/or other ground-truth data for the input string. For example, in some embodiments, an input string that is a free-text insurance carrier name variation may be provided as input to the hierarchical string matching machine learning framework to generate a carrier type prediction, standardized carrier name prediction, and/or other ground-truth data for the free-text insurance carrier name. In some embodiments, the carrier type prediction may describe (e.g., may be) the mapping label.

The term "database mapping prediction" may refer to a data construct configured to describe predicted ground-truth data with respect to an input string, where predicted ground-truth data may refer to ground-truth data that is associated with the respective entity (e.g., a particular insurance carrier). As an example, in a coordination of benefits (COB) context, predicted ground-truth data may include carrier type, standardized insurance carrier name, robotic (Robotic Process Automation) instructions, and/or the like that is determined based at least in part on the input string, where the input string may be a free-text insurance carrier name variation. In some embodiments, generating the database mapping prediction may comprise finding the closest matching data for the input string with respect to one or more target strings and/or a ground-truth database table. For example, in some embodiments generating a database mapping prediction may include matching the input string with respect to one or more keywords and/or matching the input string to a row of the plurality of rows of a ground-truth database table (e.g., matching the input string to the closest row in the ground-truth database table that satisfies a defined threshold).

The term "ground-truth database table" may refer to a data object that is configured to describe a look-up table configured for facilitating database mapping prediction for an input string. In some embodiments, the ground-truth database table may comprise a group of ground-truth database table rows, where the group of ground-truth database table rows may be associated with a group of row-wise strings. For example, each ground-truth database table row of the group of ground-truth database table rows may be associated with a row-wise string of a plurality of row-wise strings. In some embodiments, each row-wise string may be a unique row-wise string (e.g., unique entity name variation). In some embodiments, the group of row-wise strings is associated with a column (e.g., row-wise string column) in the ground-truth database table characterized by a group of data fields that correspond to the group of row-wise strings. Moreover, each row-wise string of the ground-truth database table row may be associated with a collection of ground-truth data fields that describe ground-truth data for the corresponding row-wise string, where the row-wise string data field (describing the row-wise string) and the collection of ground truth data fields may collectively define the ground-truth database table row. In some embodiments, the group of row-wise strings may be utilized to map an input string to a row of the ground-truth database table utilizing one more match models (e.g., matching techniques) of a hierarchical string matching machine learning framework. In some embodiments, a set of filters (e.g., utilizing one or more table-independent match models) may be used to determine if the input string matches any of those filters, and in response to determining that the input string matches a filter, that filter may be used to determine the ground-truth data for the input string.

The term "hierarchical string matching machine learning framework" may refer to a data construct that describes a hierarchical machine learning framework configured for generating a database mapping prediction for an input string. In some embodiments, the hierarchical string matching machine learning framework comprises a plurality of match models (e.g., machine learning models), where: (i) each match model is configured for generating a match determination (e.g., affirmative match determination or negative match determination) with respect to an input string, (ii) each match model, in response to generating an affirmative match determination, is configured to generate predicted ground-truth data (e.g., including a mapping label) with respect to the input string, and (ii) each model is associated with a hierarchical level that defines a hierarchical position of the match model in relation to other match models of the hierarchical string matching machine learning framework. The hierarchical string matching machine learning framework may comprise an initial match model associated with a first hierarchical level and one or more non-initial match models, where each non-initial match model is associated with a nth non-first hierarchical level. For example, consider a hierarchical string matching machine learning framework comprising three match models. In the example embodiment, the hierarchical string matching machine learning framework may comprise an initial match model associated with a first hierarchical level, a second match model associated with a second hierarchical level (thus corresponding to a first non-initial model), and a third match model associated with a third hierarchical level (thus, corresponding to a second non-initial model). In various embodiments, a given non-initial nth match model of the plurality of match models of the hierarchical string matching machine learning framework may be activated in a hierarchical fashion to generate a match determination for the input string based at least in part on (i) the hierarchical level of the non-initial nth match model, and/or (ii) the resultant match determination of the (n−1)th match model. In various embodiments, a required number of matching iterations may be performed to generate the database mapping prediction for an input string. Moreover, the plurality of match models of the hierarchical string matching machine learning framework may be grouped into two groups: (i) table-independent match models; and (ii) table dependent match models. In some embodiments, the group of table independent match models may be associated with a group of hierarchical levels that occur before the group of hierarchical levels associated with the table-dependent match models, such that the table-dependent match models may not be activated if an affirmative match determination is determined based at least in part on the group of table-independent match models.

The term "table-independent match model" may refer to a match model of the hierarchical string matching machine learning framework configured for generating a match determination for an input string with respect to one or more target strings (e.g., filters), where in response to determining an affirmative match determination, predicted ground-truth data is generated for the input string. For example, the one or more target stings may be used to determine non-entity-name-suggesting stings (e.g., non-carrier-name-suggesting strings). For example, in a COB context, the one or more target strings may comprise healthcare-related strings, where the healthcare-related strings may describe particular healthcare-related strings keywords (e.g., healthcare-related keywords) that are used to determine non-carrier name suggesting strings. For example, in some embodiments, a particular table-independent match model may be configured to generate a match determination for an input string with respect to one or more covid-related keyword strings (e.g., covid, omicron, delta, and/or the like) based at least in part on a rules file (e.g., configurable rules file) associated with the particular table-independent match model. As another example, in some embodiments, a particular table-independent match model may be configured to generate a match determination for an input string with respect to one or more Medicare/Medicaid-related keyword strings based at least in part on a rules file (e.g., configurable rules file) associated with the particular table-independent match model. In some embodiments, the hierarchical string matching machine learning framework may comprise one or more table-independent match models (e.g., exact match models, probabilistic match models, and/or other suitable table-independent match models)

The term "table-dependent match model" may refer to a match model of the hierarchical string matching machine learning framework configured for generating predicted ground-truth data for an input string with respect to a ground-truth database table, where the table-dependent match model may be configured to map the input string to a row of the plurality of rows of the ground-truth database table based at least in part by matching the input string to a corresponding row of the ground-truth database table (e.g., finding the closest match that satisfies a defined threshold). In some embodiments, the hierarchical string matching machine learning framework may comprise one or more table-dependent match models (e.g., disjoint match model, embedding-based match model, and/or other suitable table-dependent match models).

The term "required number of matching iterations" may refer to a data entity that is configured to describe a computer-implemented process that is configured to perform one or more string matching iterations with respect to an input string and in a hierarchical fashion in order to generate a database mapping prediction for the input string. Each matching iteration of the required number of matching iterations may be associated with a match model of a plurality of match models associated with a hierarchical string matching machine learning framework, where each match model of the hierarchical string matching machine learning framework is associated with a hierarchical level that defines a hierarchical position of the match model in relation to other match models of the hierarchical string matching machine learning framework. The required number of matching iterations may comprise at least an initial (e.g., first-level) matching iteration associated with the initial matching model of the hierarchical string matching machine learning framework. For example, the required number of matching iterations may comprise an initial matching iteration that is performed utilizing the initial match model of the hierarchical string matching machine learning framework. Additionally, in the noted example, the required number of matching iterations may comprise one or more non-initial matching iterations depending at least in part on the resultant match determination of the initial matching iteration. For example, in some embodiments, a nth non-initial matching iteration may be performed if it is determined that the resultant match determination of the (n−1)th matching iteration is a negative match determination.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like, executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing database mapping prediction. The architecture 100 includes a predictive data mapping system 101 configured to receive database mapping prediction requests from external computing entities 102, process the database mapping prediction requests to generate predictions, provide the generated predictions to the external computing entities 102, and automatically perform prediction-based actions based at least in part on the generated prediction.

An example of a prediction-based action that can be performed using the predictive data mapping system 101 is a request to generate a match prediction for a free-text entity name (e.g., free-text carrier name that includes determining a carrier type and/or standardized carrier name with respect to a ground-truth database table for the purposes of coordination of benefits (COB) investigation and/or validation. COB is the process by which a health insurance carrier determines if it should be the primary or secondary payer of medical claims for a patient who is covered by one or more healthcare insurance policy at the same time. Healthcare insurance carriers generally generate and investigate hundreds of thousands of COB leads each year to identify healthcare insurance members that have overlapping insurance coverage with other healthcare insurance carriers. A significant percentage of commercial COB leads originate through the claims process (e.g., Healthcare Insurance Claim Forms (HICF) and Explanation of Benefits (EOB)). Insurance carrier information captured during the claims process are generally captured as free-text, and entered manually (e.g., by employees of healthcare insurance carriers) with little to no validation. The inventors have identified that a significant percentage of insurance carrier names captured during the claims process do not relate to insurance coverage at all (e.g., Invalid Carriers, Liability, Supplemental, and/or the like). Moreover, the other insurance coverage for a healthcare insurance member may be Medicare, Medicaid, Tricare, Student, Market.

In some embodiments, predictive data mapping system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The predictive data mapping system 101 may include a predictive data mapping computing entity 106 and a storage subsystem 108. The predictive data mapping computing entity 106 may be configured to receive predictive data mapping requests from one or more external computing entities 102, process the predictive data mapping requests to generate predictions corresponding to the predictive data mapping requests, provide the generated predictions to the external computing entities 102, and automatically perform prediction-based actions based at least in part on the generated predictions.

The storage subsystem 108 may be configured to store input data used by the predictive data mapping computing entity 106 to perform predictive data mapping (e.g., health-related predictions), as well as model definition data used by the predictive data mapping computing entity 106 to perform various predictive data mapping tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Mapping Computing Entity

Figure 2:
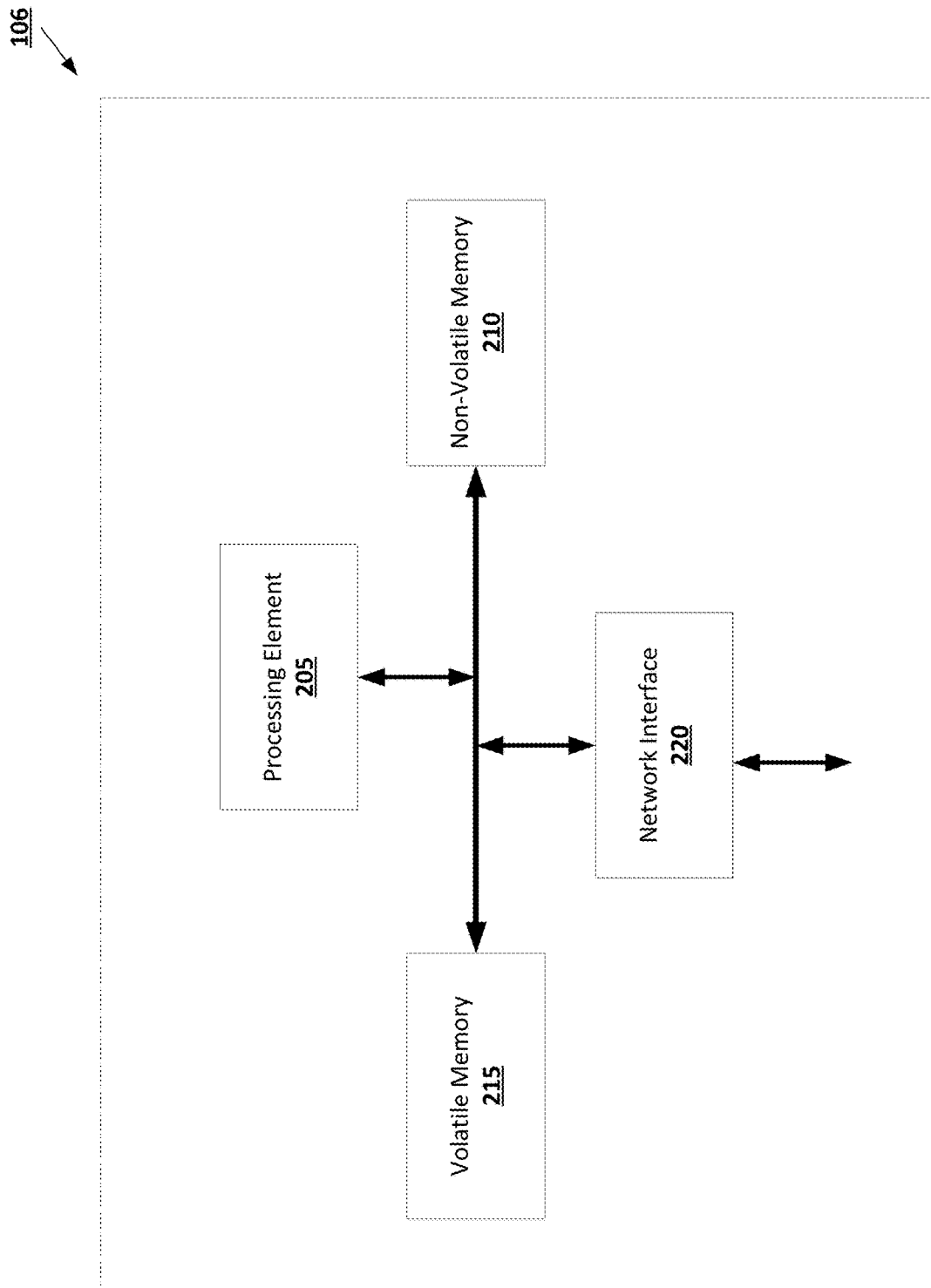
FIG. 2 provides an example predictive data mapping computing entity in accordance with some embodiments discussed herein.

FIG. 2 provides a schematic of a predictive data mapping computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data mapping computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data mapping computing entity 106 may include, or be in communication with, one or more processing elements 205 (also referred to as processors, processing circuitry, and/or similar terms used herein interchangeably) that communicate with other elements within the predictive data mapping computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data mapping computing entity 106 may further include, or be in communication with, non-volatile media (also referred to as non-volatile storage, memory, memory storage, memory circuitry, and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data mapping computing entity 106 may further include, or be in communication with, volatile media (also referred to as volatile storage, memory, memory storage, memory circuitry, and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data mapping computing entity 106 with the assistance of the processing element 205 and operating system.

As indicated, in one embodiment, the predictive data mapping computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data mapping computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data mapping computing entity 106 may include, or be in communication with, one or more input elements, such as a keyboard input, a mouse input, a touch screen/display input, motion input, movement input, audio input, pointing device input, joystick input, keypad input, and/or the like. The predictive data mapping computing entity 106 may also include, or be in communication with, one or more output elements (not shown), such as audio output, video output, screen/display output, motion output, movement output, and/or the like.

Exemplary External Computing Entity

Figure 3:
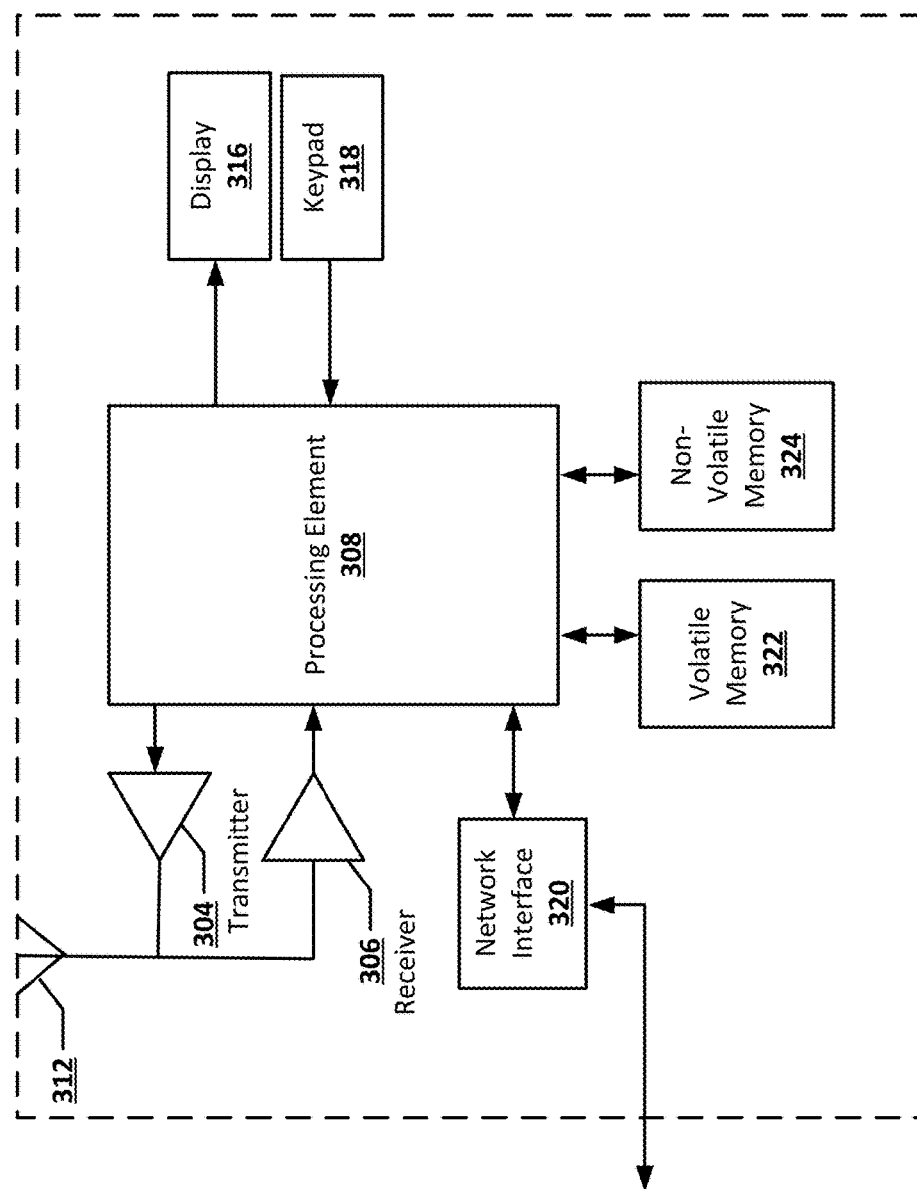
FIG. 3 provides an example external computing entity in accordance with some embodiments discussed herein.

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data mapping computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data mapping computing entity 106 via a network interface 320.

Via these communication standards and protocols, the external computing entity 102 can communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies, including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data mapping computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102, and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data mapping computing entity 106 and/or various other computing entities.

In another embodiment, the external computing entity 102 may include one or more components or functionalities that are the same or similar to those of the predictive data mapping computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present disclosure make important technical contributions to improving predictive accuracy of string-based machine learning models by introducing innovative machine learning techniques that enable using trained models in combination with rule-based techniques in a manner that is configured to improve training speed and training efficiency of string-based machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, the techniques described herein improve predictive accuracy without harming training speed, such as various techniques described herein, enable improving training speed given a constant predictive accuracy. In doing so, the techniques described herein improve accuracy, efficiency, and speed of machine learning models, thus reducing the number of computational operations needed and/or the amount of training data entries needed to train string-based machine learning models. Accordingly, the techniques described herein improve at least one of the computational efficiency, storage-wise efficiency, and speed of training machine learning models.

Moreover, various embodiments of the present invention improve computational efficiency of performing string-based machine learning models by introducing techniques that limit the use of trained string-input machine learning models to instances where less computationally-expensive rule-based model operations fail to generate a satisfactory match. For example, various embodiments of the present invention introduce a hierarchical string matching machine learning framework that comprises a group of table-independent match models and a plurality of table-dependent match models, where the group of table-independent match models comprise a plurality of exact match models and a plurality of probabilistic match models, the plurality of table-dependent match models comprises a disjoint match model and an embedding-based match model, and each table-independent match model is associated with a respective mapping label of a plurality of defined mapping labels, each probabilistic match model is triggered in response to determining that each exact match model is associated with a negative exact match determination, the disjoint match model is triggered in response to determining that each probabilistic match model is associated with a negative probabilistic match determination, and the embedding-based match model (which in some embodiments is the component that uses one or more machine learning operations) is triggered in response to determining that the disjoint match model is associated with a negative disjoint match determination. In this way, the noted embodiments of the present invention limit the use of trained string-input machine learning models to instances where less computationally-expensive rule-based model operations fail to generate a satisfactory match, an approach that in turn improves computational efficiency of performing string-based machine learning models.

Figure 4:
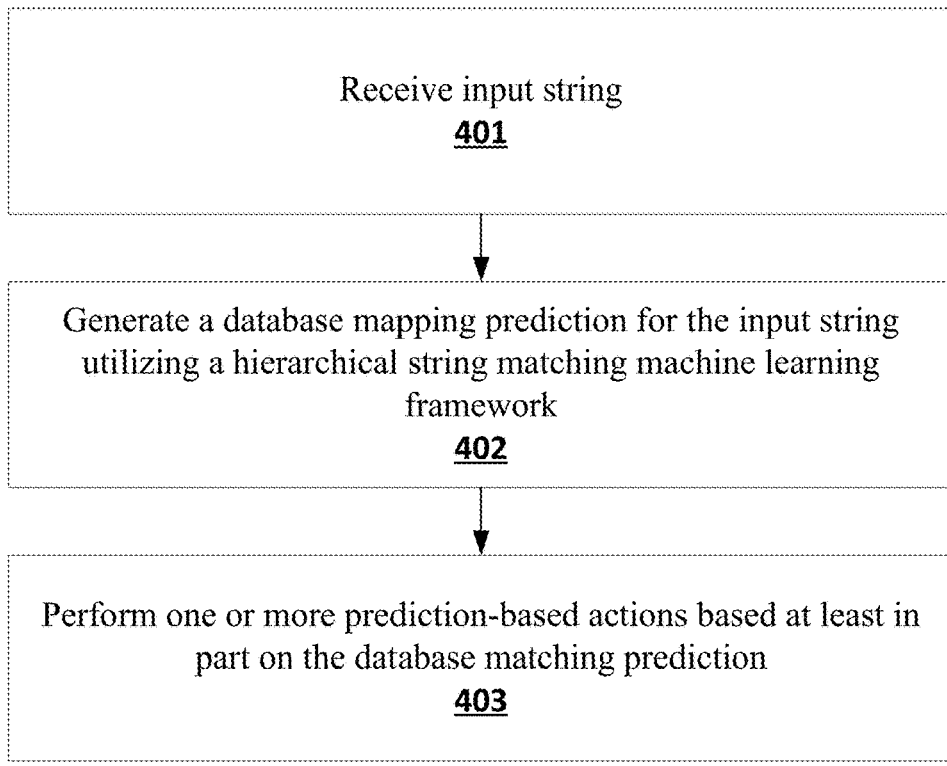
FIG. 4 is a flowchart diagram of an example process for generating a database mapping prediction for an input string with respect to a ground-truth database table in accordance with some embodiments discussed herein.

FIG. 4 provides a flowchart diagram of an example process 400 for generating a database mapping prediction for an input string with respect to a ground-truth database table. Via the various steps/operations of the process 400, the predictive data mapping computing entity 106 can efficiently and reliably generate a database mapping prediction for an input string using a hierarchical string matching machine learning framework, and perform one or more prediction-based actions based at least in part on the database matching prediction. In various embodiments the predictive data mapping computing entity 106 is configured to receive an input string as input and generate predicted ground-truth data for the input string along with a confidence score associated with the predicted ground-truth data.

In some embodiments, the process 400 begins at step/operation 401 when the predictive data mapping computing entity 106 receives an input string. An input string may describe information/data with respect to which one or more predictive tasks/operations are performed to generate a database mapping prediction. The input string may be a word string (e.g., a word, a sequence of words, and/or the like). For example, in some embodiments, the input string may be a word string intended to describe freely defined names that refer to the same entity (e.g., healthcare insurance carrier name), where examples of healthcare insurance carriers include commercial healthcare insurance companies, government programs such as Medicare and Medicaid, and/or the like. Accordingly, the input string may be a free-text entity name variation string (e.g., free-text carrier name variation string) or a non-entity-name suggesting string (e.g., free-text non-carrier-name-suggesting-string)

In various embodiments, the input string may be used to generate predicted ground-truth data (e.g., including mapping label and/or other ground-truth data). For example, in a COB investigation context, the input string (e.g., a carrier name variation or non-carrier-name-suggesting string) may be used to generate a carrier type prediction and/or standardized carrier name prediction for the input string, where the predicted carrier type (e.g., commercial carrier type, Medicare carrier type, Medicaid carrier type, and/or the like) may be the mapping label, which, in turn, may be used to perform one or more prediction based actions (e.g., COB-related prediction based actions) and/or may be used to generate and/or identify other features/data with respect to the input string. In the noted example, a given standardized carrier name may be associated with a plurality of unique carrier name variations of a particular insurance carrier, and describe the ground-truth name for the insurance carrier associated with the plurality of unique carrier name variations. In some embodiments, the standardized carrier name may be used to generate and/or identify other features/data associated with the insurance carrier associated with the plurality of insurance carrier name variations, and/or may be used to perform one or more prediction-based actions (e.g., COB-related prediction-based actions), such as submitting eligibility requests to an insurance carrier based at least in part on the predicted standardized insurance carrier name. For example, as described above, a given standardized carrier name (e.g., standardized insurance carrier name) may be associated with multiple variations of a particular insurance carrier name, such that for an input string that is a variation of the particular insurance carrier name, the input string may be matched to the standardized carrier name. In the noted example, eligibility requests for a claim associated with the input string may then be submitted to the insurance carrier associated with the standardized carrier name (e.g., the health insurance carrier having the standardized carrier name). For instance, in the example described above, input strings "Blue shield of California Out of State" and "Blue Shield CA" may, for example, each be associated with the standardized carrier name "Blue Cross Blue Shield of Alaska (premera)," such that eligibility request for claims having "Blue shield of California Out of State" or "Blue Shield CA" may be submitted to "Blue Cross Blue Shield of Alaska (premera)."

In some embodiments, the input string may be represented as free-text data (e.g., unstructured data, semi-structured data, and/or a combination thereof). For example, in some embodiments, the input string may be free-text insurance carrier name variation or free-text-text non-carrier-name suggesting string. In various embodiments, the input string may be extracted from a document data object (e.g., healthcare insurance claims form). In some embodiments, the predictive data mapping computing entity 106 may receive the input string from an external computing entity 102. In some embodiments, the external computing entity 102 may be associated with one or more input string sources such as coordination of benefits (COB) investigation source. In some embodiments, the predictive data mapping computing entity 106 may receive input data (e.g., claims data) from an external computing entity 102 and process the input data to generate the input string, where processing the input data may comprise extracting the input string from the input data.

At step/operation 402, the predictive data mapping computing entity 106 generates a database mapping prediction for the input string utilizing a hierarchical string matching machine learning framework. In some embodiments, generating the mapping prediction comprises generating predicted ground-truth data with respect to the input string based at least in part on one or more keyword strings and/or ground-truth database table, where the ground-truth database table may describe a look-up table configured for facilitating database mapping prediction for an input string. In some embodiments, the ground-truth data may include a mapping label (described further below). For example, in a COB context, the ground-truth data may include carrier type (e.g., commercial carrier, Medicare, Medicaid, invalid carrier, Segment Compare, and/or other carrier types), standardized carrier name, (e.g., standardized insurance carrier name), and/or other ground-truth data. In the noted COB context, in some embodiments, the mapping label for a given input string may describe the predicted carrier type, where the mapping label may be used to perform one or more prediction-based actions (e.g., transmitting an eligibility request for the healthcare claim associated with the input string to a clearinghouse API) based at least in part on the mapping label, determining instructions for robotic agents (e.g., bots) and/or API's based at least in part on the mapping label, and/or other prediction-based actions. In some embodiments, the predictive data mapping computing entity 106 may perform one or more pre-processing operations. For example, in some embodiments, the predictive data mapping computing entity 106 may be configured to convert an input string into a lower case format as a pre-processing operation (e.g., prior to providing as input to the hierarchical string matching machine learning framework.

Ground-Truth Database Table

In some embodiments, the ground-truth database table may comprise a group of ground-truth database table rows, where the group of ground-truth database table rows may be associated with a group of row-wise strings, and where the group of row-wise strings may be utilized to match (e.g., closed match) an input string to a corresponding ground-truth database table row of the group of ground-truth database table rows. In some embodiments, the group of row-wise strings may describe or otherwise comprise a group of entity name variations. For example, in a COB context, the group of row-wise strings may describe or otherwise comprise a group of carrier name variations. Additionally, in some embodiments, the group or row-wise strings may include a "Null" string configured for matching non-entity-name-suggesting strings. In some embodiments, the group of row-wise strings may comprise a plurality of unique row-wise strings, such that each ground-truth database table row of the group of ground-truth database table rows may be associated with a unique row-wise string of the group of row-wise strings, and an input string may be matched to a ground-truth database table row based at least in part on the corresponding row-wise string. For example, in various embodiments, each ground-truth database table row may be characterized by a plurality of data fields, where the plurality of data fields includes a row-wise data field that describes (e.g., stores) a unique row-wise string of the group of row-wise strings, and a group of ground-truth data fields, where each ground-truth data field describes (e.g., stores) ground-truth data (also referred to as ground-truth property) associated with corresponding row-wise data field (thus, row-wise string). Accordingly, in some embodiments, each ground-truth database table row of the ground-truth database table may comprise a row-wise string data field and a group of ground-truth data fields that collectively define a ground-truth database table row. In various embodiments, the group of row-wise data fields (thus, group of row-wise strings) may be associated with a particular ground-truth database table column (e.g., a predefined column in the ground-truth database table comprising or otherwise associated with the group of row-wise strings).

In a COB context for example, in some embodiments, the group of ground-truth data fields of a particular ground-truth database table row may include one or more of: (i) carrier type data field that describes an insurance carrier type for the row-wise string associated with the particular group of ground-truth database table row, (ii) robotic agent instruction data field that describes, with respect to the row-wise string associated with the particular group of ground-truth database table row, predefined instructions for robotic agents (bots) at least in part for the purposes of automated processing (e.g., Robotic Process Automation) associated with the COB process, (iii) Application Programming Interface (API) carrier data field that describes the standardized carrier name for the row-wise string associated with the particular ground-truth database table row, (iv) other ground-truth data that may or may not be related to COB. In some embodiments, each ground-truth database table row may be associated with a defined mapping label of a plurality of defined mapping labels. In some embodiments, the plurality of defined mapping labels may describe or otherwise comprise a plurality of defined entity types (e.g., carrier types), where each row-wise string may be associated with an entity type (e.g., carrier type) of the plurality of defined entity types (e.g., carrier types). For example, in some embodiments, the plurality of defined mapping labels may include commercial carrier, Medicare, Medicaid, Invalid Carrier, Segment Compare, and/or other carrier types. In the noted example embodiments, one or more carrier types (e.g., Invalid Carrier) may be configured to reduce false positives by being configured to be matched to a non-entity-name-suggesting string (e.g., non-carrier-name-suggesting string).

Accordingly, in some embodiments, the ground-truth database table may describe a coordination of benefits (COB) look-up table characterized by a group of ground-truth database table rows each comprising a row-wise string data field and a group of ground-truth data fields associated with the row-wise string data field, where each row-wise string data field describes at least one of: (i) a unique insurance carrier name variation string or (iii) or null string, and where each group of ground-truth data fields may describe COB-related information/data (e.g., ground-truth data) that may be utilized to determine COB eligibility with respect to an insurance carrier (e.g., based at least in part on the row-wise string carrier name variation, carrier type and/or standardized insurance carrier name). For example, for a given healthcare claim, an eligibility request may be submitted to a clearinghouse (e.g., via clearinghouse API) based at least in part on the ground-truth data associated with a row-wise string determined from claim data associated with the healthcare claim.

In some embodiments, the ground-truth database table may be generated based at least in part on historical data. For example, in a COB context, the ground-truth database table may be generated based at least in part on historical healthcare-related claims data, such as COB claims data, where, as noted above, the ground-truth database table may be configured to facilitate matching of an input string (e.g., insurance carrier name variation) associated with an healthcare claim to a ground-truth database table row, so as to generate predicted ground-truth data (e.g., carrier type, standardized carrier name (e.g., payer), and/or other ground-truth data that may or may not be related to COB.

Figure 5:
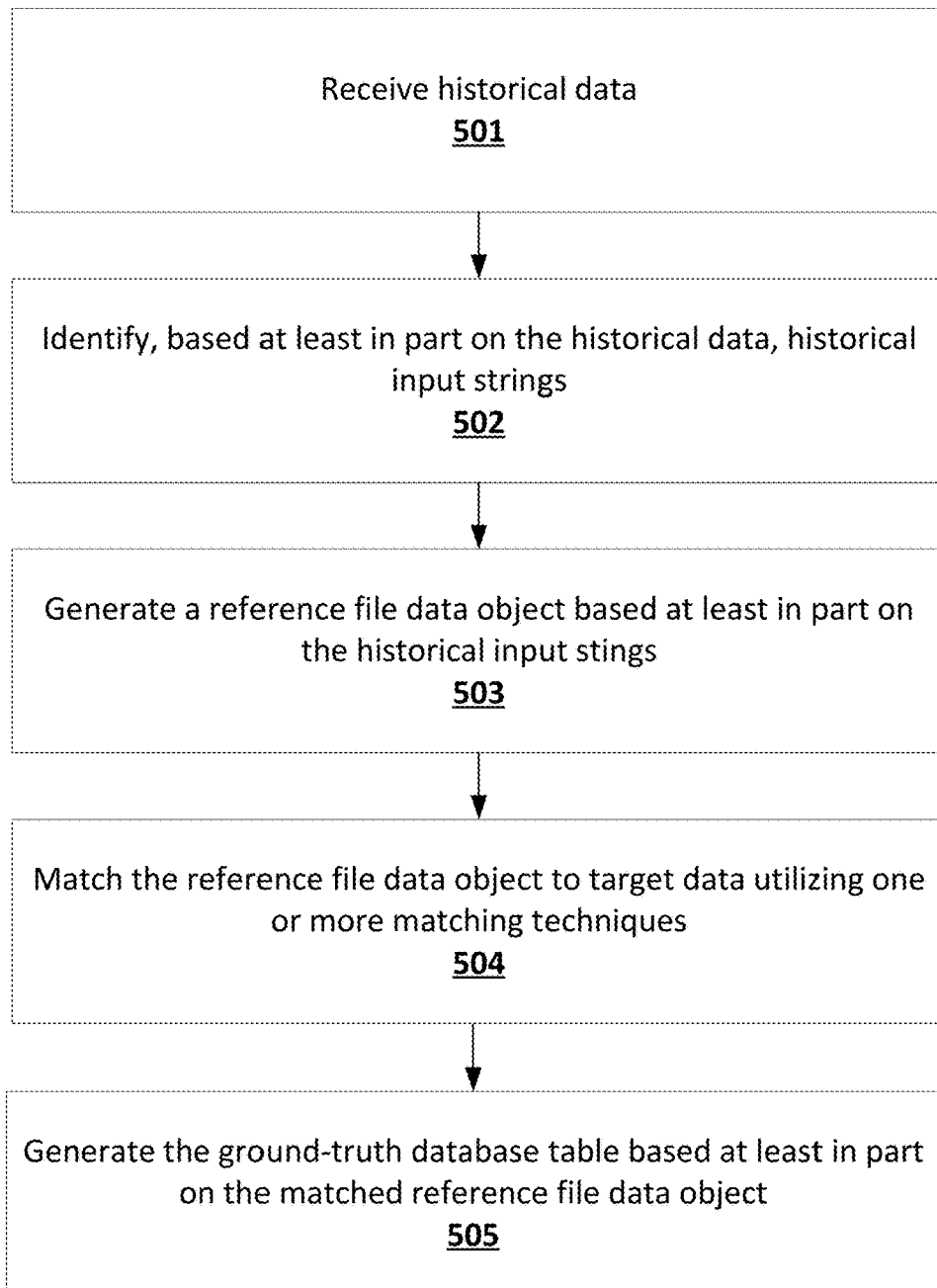
FIG. 5 provides a flowchart diagram of an example process for generating a ground-truth database table in accordance with some embodiments discussed herein.

In some embodiments, the ground-truth database table may be generated in accordance with the process 500 that is depicted in FIG. 5, which is an example process for generating a ground-truth database table. While the process 500 is described as being performed by the predictive data mapping computing entity 106, in some embodiments, the process 500 may be performed by other computing entities. The process 500 begins at step/operation 501 when the predictive data mapping computing entity 106 receives and/or retrieves historical data (e.g., historical claims data such as COB related claims data). In some embodiments, the predictive data mapping computing entity 106 may receive and/or retrieve the historical data from one or more external computing entities 102 and/or the predictive data mapping computing entity 106. In some embodiments, the predictive data mapping computing entity 106 may receive and/or retrieve historical record comprising the historical data from one or more external computing entities 102 and/or the predictive data mapping computing entity 106, and extract the historical data from the historical record.

At step/operation 502, the predictive data mapping computing entity 106 identifies, based at least in part on the historical data, a plurality of historical input strings. In some embodiments, the predictive data mapping computing entity 106 may process the historical data to identify and/or extract historical input strings from the historical data. In some embodiments the historical input strings may comprise a plurality free-text entity names and name variations. For example, in a COB context the historical data may comprise historical coordination of benefits (COB) claims data and the plurality of historical input strings may comprise a plurality of free-text entity names and variations (e.g., insurance carrier names and variations thereof), where, for example, the predictive data mapping computing entity 106 may identify and/or extract the free-text entity names and variations (e.g., insurance carrier names and variations) from the historical coordination of benefits (COB) claims data. For example, the historical COB claims data may be determined from and/or extracted from historical claim forms, and/or the like.

At step/operation 503, the predictive data mapping computing entity 106 generates a reference file data object based at least in part on the historical input strings (e.g., identified from the historical data). For example, in some embodiments, the predictive data mapping computing entity 106 generates a reference file data object based at least in part on the insurance carrier names and/or variations of insurance carrier names identified from the historical data (e.g., COB-related claims data). In some embodiments, the reference file data object may comprise each unique historical input string (e.g., entity names and variations) identified at step/operation 502. Additionally, in some embodiments, the reference file data object may comprise other data (e.g., entity type) associated with the historical input string.

At step/operation 504, the predictive data mapping computing entity 106, utilizing one or more matching techniques, matches the reference file data object against a set of target data. In some embodiments, matching the reference file data object against the set of target data comprise matching the historical input strings in the reference file data object against the set of target data, where the set of target data describes or otherwise comprise standardized entity names (e.g., standardized carrier names). For example, consider the example embodiment, where the reference file data object comprises unique free-text historical insurance carrier names and variations thereof. In the noted example embodiment, the set of target data may comprise a plurality of standardized carrier names. As such, matching a reference file data object against a set of target data may comprise matching insurance carrier names identified from historical claims data to standardized carrier names. In some example embodiments, the target data may additionally comprise, for each standardized insurance carrier name, other ground-truth data associated with the defined carrier name, such as carrier type (e.g., entity type), robotic agent instructions for automated processing, and/or the like.

In some embodiments, to match the reference file data object to the target data, the predictive data mapping computing entity 106 utilizes one or more matching techniques. In some embodiments, the predictive data mapping computing entity 106 may be configured to match historical input strings (e.g., free-text entity names and variations, thereof) in the reference file data object to corresponding target data (e.g., standardized entity names), utilizing fuzzy matching logic (e.g. string approximation algorithm). Accordingly, in some embodiments, matching the reference file data object to target data, may comprise applying a string approximation algorithm with respect to the different entity name variations (e.g., carrier names variations) and the standardized entity carrier names (e.g., standardized carrier names). In some embodiments, matching the reference file data object to the target data may comprise applying one or more rules. For example, in some embodiments, a configurable input file that defines certain rules and logic may be used to augment the fuzzy matching. For example, in some embodiments, one or more defined rules and/or logic (e.g., COB-related rules and/or logic) may be applied, such that the matching process may be enhanced or otherwise improved.

At step/operation 505, the predictive data mapping computing entity 106, generates the ground-truth database table based at least in part on the matched reference file data object. In some embodiments, generating the ground-truth database table may comprise processing the matched reference file data object to generate the ground-truth database table. For example, the matched reference file data object may be manually verified (e.g., each matched data may be manually verified) by subject matter experts (SMEs) having deep knowledge of the entities identified by the free-text entity names and name variations. For example, in a COB investigation context, the matched reference file data object may be verified by one or more subject matter experts (SMEs), where the SMEs may utilize online eligibility verification (e.g., online search) and/or the SMEs COB knowledge of insurance carrier names and carrier types (insurance carrier types). In the noted example, the SMEs may review the free-text carrier names and based at least in part on the SMEs experience, knowledge, and/or online verification search, verify the matched data and/or refine mismatches.

Furthermore, in the noted example, the SMEs may determine and assign a categorical label (e.g., entity type) for each unique entity name and variation (e.g., insurance carrier name variation). For example, using the COB context for illustration, the SMEs may investigate and/or determine whether a carrier name (e.g., based at least in part on the standardized carrier name) is associated with an eligible COB insurance carrier, and in response to determining that a carrier name is not associated with an eligible insurance carrier, the carrier name may be associated with (or otherwise assigned) a carrier type of "Invalid Carrier", "Supplemental", or "Liability," and the associated/assigned carrier type may be applied to the corresponding carrier type data field for the insurance carrier name in the ground-truth database table. Additionally, in the noted example, in response to determining that an insurance carrier name is associated with an eligible COB insurance carrier, the insurance carrier name may be associated with (or otherwise assigned) the corresponding carrier type, and the associated/assigned carrier type may be applied to the carrier type data field for the insurance carrier in the ground-truth database table. In example embodiments, a carrier type may indicate the corresponding insurance plan type (e.g., commercial, Medicare, Marketplace, and/or the like). In some embodiments, other ground-truth data (e.g., robotic agent instructions) may be determined and/or assigned to each insurance carrier name (e.g., based at least in part on the assigned entity type (e.g., carrier type) and/or standardized entity name (e.g., standardized carrier name)).

Figure 6:
FIG. 6 provides an operational example of a ground-truth database table in accordance with some embodiments discussed herein.

FIG. 6 depicts an operational example 600 of a ground-truth database table (e.g., in a COB context). As shown in FIG. 6, each row-wise data field is configured to describe a unique insurance carrier name 602 or a null data field (not shown). As further depicted in FIG. 6, for each row-wise data field, the associated group of ground-truth data fields comprise Carrier Type data field 604 that describes the carrier category/class for the given insurance carrier associated with insurance carrier name variation, Robotic Agent Instructions data field 606 that describes instructions for Robotic Process Automation (e.g., associated with the COB process), such as instructions to conduct manual review, instructions to proceed to Application Programming Interface (API) review, instructions to follow Medicare process, and/or the like, Application Programming Interface (API) carrier data field 608 that describes the standardized carrier name for carrier name variations of an insurance carrier with respect to which an eligibility request may be submitted (e.g., based at least in part on the carrier type, and/or other COB-related data). In some embodiments, the ground-truth database table may additionally include data fields that comprise the standardized carrier names in a format that is compatible and/or consistent with the clearinghouse where eligibility requests are to be submitted. For example, in some embodiments, the predictive data mapping computing entity 106 may be configured to convert the predicted free-text standardized carrier names to a format that is compatible and/or consistent with the clearinghouse, and may store the converted data in corresponding data fields of the ground-truth database table.

Hierarchical String Matching Machine Learning Framework

As noted above, in some embodiments, the predictive data mapping computing entity 106 generates the database mapping prediction for the input string utilizing a hierarchical string matching machine learning framework and based at least in part on the input string. A hierarchical string matching machine learning framework may comprise a set of match models, that are each configured for generating a match determination (e.g., affirmative match determination or negative match determination) for an input string with respect to the ground-truth database table and/or one or more defined keywords strings. In some embodiments, each match model of the set of match models of the hierarchical string matching machine learning framework may be associated with a hierarchical level that defines a hierarchical position of the respective match model in relation to other match models of the hierarchical string matching machine learning framework. As such, each match model of the set of match models may be associated with a match model order (e.g., hierarchical order). For example, in some embodiments, the hierarchical string matching machine learning framework may comprise: (i) an initial match model associated with a first hierarchical level; and (ii) one or more non-initial match models, where each nth non-initial match model may be associated with a nth non-first hierarchical level. For example, consider a hierarchical string matching machine learning framework comprising three match models. In the noted example, the hierarchical string matching machine learning framework may comprise an initial match model associated with a first hierarchical level, a second match model associated with a second hierarchical level (thus corresponding to a first non-initial model), and a third match model associated with a third hierarchical level (thus, corresponding to a second non-initial model).

In some embodiments, generating a database mapping prediction for an input string, utilizing the hierarchical string matching machine learning framework may comprise performing a required number of matching iterations with respect to the input string, where each matching iteration of the required number of matching iterations may be associated with a match model of the set of match models of the hierarchical string matching machine learning framework. A required number of matching iterations may describe a computer-implemented process that is configured to perform one or more matching iterations (e.g., required number of matching iterations) with respect to an input string until an earlier satisfied condition of: (i) reaching a qualifying matching iteration that is associated with a match model whose match determination is an affirmative match determination or (ii) a final matching iteration that is associated with a final match model of the set of match models. As such, in some embodiments, one or more matching iterations are performed with respect to the input string using a different match model of the set of match models for each iteration until a first affirmative match determination is generated by one of the one or more match models, or each match model of the set of match model has been activated (e.g., utilized in performing a match determination).

In some embodiments, the required number of matching iterations may comprise at least an initial (e.g., first-level) matching iteration associated with the initial match model of the hierarchical string matching machine learning framework, and may or may not comprise one or more non-initial matching iterations depending at least in part on the resultant match determination of the initial matching iteration. For example, the required number of matching iterations may comprise an initial matching iteration that is performed utilizing the initial match model of the hierarchical string matching machine learning framework, and a nth non-initial matching iteration may be performed if it is determined that the resultant match determination of the (n−1)th matching iteration is a negative match determination. As such, in some embodiments, a non-initial nth match model of the set of match models of the hierarchical string matching machine learning framework may or may not be activated to generate a match determination for the input string based at least in part on (i) the hierarchical level of the non-initial nth match model, and/or (ii) the resultant match determination of the (n−1)th match model, where activating a particular match model comprises performing a matching iteration utilizing the particular match model. For example, consider a hierarchical string matching learning framework comprising a first initial hierarchical level that includes a match model M1, a second non-initial hierarchical level that includes a match model M2, and a third hierarchical level that includes a match model M3. In the noted example, match model M1, which is associated with the first initial hierarchical level may be activated first. Additionally, match model M2 having a second hierarchical level may be activated next based at least in part on the match determination of match model M1 (e.g., match model M2 may be activated only if the match determination associated with match model M1 with respect to the input string is a negative match determination). Moreover, match model M3 may not be activated if match model M2 is not activated. Furthermore, if match model M2 is activated, match model M3 may be activated based at least in part on the matching determination of match model M2 (e.g., match model M3 may be activated only if the match determination associated with match model M2 with respect to the input string is a negative match determination).

In some embodiments, the set of match models of the hierarchical string matching machine learning framework may be grouped into two categories: (i) table-independent match models; and (ii) table dependent match models. In some embodiments, the set of match models may comprise a group of table-independent match models and a plurality of table-dependent match models. In some embodiments, each table-independent match model of the group of table-independent match models may be associated with ground-truth data that includes a defined mapping label of the plurality of defined mapping labels, where the defined mapping label may describe a categorical label for the particular table-independent match model. As described above, in example embodiments, the plurality of defined mapping label may comprise predefined entity types. For example, in a COB context, the plurality of mapping labels may include Commercial carrier type, Medicare carrier type, Medicaid carrier type, Tricare carrier type, Segment Compare carrier type, Marketplace carrier type, Student carrier type, Liability carrier type. Supplemental carrier type, Invalid carrier type. Additionally, each table-independent match model may be associated with other ground-truth data. In a COB context for example, in some embodiments, each table-independent match model may additionally be associated with robotic processing automation (e.g., robotic agent) instructions associated with the carrier type. In some embodiments, one or more mapping labels of the plurality of mapping label may be a redirecting mapping label, where in response to determining that the input string is matched to a mapping label that is a redirecting mapping label, one or more API call operation may be performed with respect to an API of the redirecting mapping label. In some embodiments, an example of a redirecting mapping label is a commercial carrier type.

In some embodiments, the group of table-independent match models may precede the plurality of table-dependent match models in the hierarchical order of the hierarchical string matching machine learning framework, such that a table-dependent match model may be activated only if the match determination of each activated table-independent match model is a negative match determination. As such, in some embodiments, none of the table dependent match models may be activated if based at least in part on the group of table-independent match models an affirmative match determination is generated for the input string (e.g., entity name variation).

In some embodiments, the group of table-independent match models may comprise one or more exact match models and/or one or more probabilistic match models. In some embodiments, the group of table-independent match models may comprise a plurality of exact match models and a plurality of probabilistic match models, where each exact match model precedes each probabilistic match model in the hierarchical order of the hierarchical string matching machine learning framework. Accordingly, in the noted embodiments, each exact match model must be activated before a probabilistic match model may be activated. Moreover, in the noted example embodiments, a probabilistic match model may be activated only if each exact match model of the plurality of exact match models is activated and associated with a negative affirmative determination.

In some embodiments, each exact match model may be associated with an exact match rules file that describes one or more exact target strings for the exact match model. In some embodiments, each exact match model, when activated, may be configured to retrieve the exact match rules file associated with the exact match model and determine whether the input string exactly matches one of the one or more exact target strings (e.g., by comparing the input string to each exact target string in order to determine if they are an exact match). In some embodiments, each exact match model, in response to determining that the input string exactly matches one of the one or more exact target strings, may be configured to: (i) generate predicted ground-truth data that includes a selected mapping label for the input string based at least in part on the mapping label for the exact match model, where the selected mapping label may describe the mapping label (e.g., entity type) associated with the exact match model, and (ii) generate an affirmative exact match determination. In some embodiments, the predicted ground-truth data, in addition to the selected mapping label may include other ground-truth data such as robotic processing automation (e.g., in a COB context). In some embodiments, each exact match model, in response to determining that the input string does not exactly match any of the one or more exact target strings, may be configured to generate a negative exact match determination.

In some embodiments, each probabilistic match model may be associated with a probabilistic match rules file that describes one or more probabilistic target strings for the probabilistic match model. In some embodiments, the probabilistic match rules file for a given probabilistic match model may additionally describe an optimized probabilistic match threshold for the probabilistic match model, where the optimized probabilistic match threshold may be configured to be utilized in determining whether the output of the probabilistic match model is associated with an affirmative probabilistic match determination or a negative probabilistic match determination. In some embodiments the probabilistic match models may utilize probabilistic matching techniques such as fuzzy matching logic to generate the probabilistic match determination with respect to the input string. For example, in some embodiments, each activated probabilistic match model may be configured to perform pairwise fuzzy match operations with respect to the input string and the one or more probabilistic target strings of the probabilistic match model.

In some embodiments, each probabilistic match model, when activated, may be configured to: (i) retrieve the probabilistic match rules file associated with the probabilistic match model; and (ii) for each probabilistic target string for the probabilistic match model, generate a respective pairwise fuzzy match score with respect to the input string (e.g., by comparing the input string to the probabilistic target string using one or more probabilistic-based techniques such as fuzzy match technique). In some embodiments, each activated probabilistic match model may be configured to determine whether at least one respective pairwise fuzzy match score satisfies the optimized probabilistic match threshold for the activated probabilistic match model. In some embodiments, each activated probabilistic match model, in response to determining that at least one pairwise fuzzy match score satisfies the optimized probabilistic match threshold for the activated probabilistic match model may be configured to: (i) generate predicted ground-truth data including the selected mapping label for the input string based at least in part on the mapping label for the probabilistic match model, where the selected mapping label may describe the mapping label associated with the probabilistic match model; and (ii) generate an affirmative probabilistic match determination. In some embodiments, the predicted ground-truth data, in addition to the selected mapping label may include other ground-truth data such as robotic processing automation (e.g., in a COB context). In some embodiments, each probabilistic match model, in response to determining that none of the respective pairwise fuzzy match scores satisfies the optimized probabilistic match threshold for the probabilistic match model may be configured to generate a negative probabilistic match determination.

In some embodiments, to generate the optimized probabilistic match threshold for a particular probabilistic match model, the following operations are performed: (i) identifying a user-selected selection success ratio hyper-parameter for the respective mapping label that is associated with the particular probabilistic match model; (ii) detecting, based at least in part on experimentation data associated with the particular probabilistic match model, a lowest qualifying probabilistic match threshold that satisfies a selection outcome defined by the user-selected selection success ratio hyper-parameter; and (iii) generating the optimized probabilistic match threshold based at least in part on the lowest qualifying probabilistic match threshold. In some embodiments, the optimized probabilistic match threshold is the lowest qualifying probabilistic match threshold. A user-selected selection success ratio hyper-parameter may describe the desired matching success rate with respect to a probabilistic target string of the particular probabilistic match model. For example, consider where the probabilistic matching string is "Medicare" and it is desired that Medicare cases (e.g., input strings associated with Medicare) be matched 80% of the time. In the noted example, the user-selected selection success ratio hyper-parameter for the particular probabilistic match model may correspond to 80%.

In some embodiments, the plurality of table-dependent match models comprise a disjoint match model and an embedding-based match model. In some embodiments, the disjoint match model may precede the embedding-based match model in the hierarchical order of the hierarchical string matching machine learning framework.

In some embodiments, the disjoint match model may be activated in response to determining that each probabilistic match model is associated with a negative probabilistic match determination. In some embodiments, the disjoint match model, when activated, is configured to determine whether the token count of the input string satisfies a token count threshold, and (ii) in response to determining that the token count of the input string satisfies the token count threshold, perform a required number of row-wise token match determination iterations until an earlier-satisfied condition of: (a) reaching a qualifying row-wise token match determination iteration that is associated with a qualifying row-wise string whose qualifying token match score with respect to the input string satisfies a qualifying token match score threshold, or (b) reaching a final row-wise token match determination iteration that is associated with a final row-wise string of the group of row-wise strings. In some embodiments, each ith row-wise token match determination iteration is associated with an ith row-wise string of the group of row-wise strings that is selected in accordance with a row order for the group of ground-truth database table rows. In some embodiments, in response to reaching the qualifying row-wise token match determination iteration, the selected mapping label for the input string is generated based at least in part on a row-wise mapping label for the qualifying row-wise string and an affirmative disjoint match determination is generated, where the row-wise mapping label may describe the mapping label (e.g., entity type/carrier type) associated with the ground-truth database table row of the qualifying row-wise string in the ground-truth database table.

In some embodiments, the embedding-based match model may be activated in response to determining that the disjoint match model is associated with a negative disjoint match determination. In various embodiments, the embedding-based match model is configured to, in response to determining that the disjoint match model is associated with a negative disjoint match determination: (i) generate, based at least in part on an input string embedding vector for the input string and a group of row-wise string embedding vectors for the group of row-wise strings, a defined-size subset of highest-likelihood matched row-wise strings in the group of row-wise strings, (ii) for each row-wise string in the defined-size subset, generate a corresponding pairwise fuzzy match score with respect to the input string, and (iii) in response to determining that at least one corresponding pairwise fuzzy match score satisfies a pairwise fuzzy match score threshold: (a) generate the selected mapping label for the input string based at least in part on the row-wise mapping label for the row-wise string in the defined-size subset that is associated with a highest corresponding pairwise fuzzy match, where the row-wise mapping label may describe the mapping label (e.g., entity type/carrier type) for the row-wise string in the defined-size subset that is associated with a highest corresponding pairwise fuzzy match, and (b) generate an affirmative embedding-based match determination.

Generating a Database Mapping Prediction

In some embodiments, the step/operation 402 may be performed in accordance with the process 700 that is depicted in FIG. 7, which is an example process for generating, utilizing a hierarchical string matching machine learning framework, a database mapping prediction for an input string with respect to a ground-truth database table. The process 700 begins at step/operation 701 when the predictive data mapping computing entity 106, utilizing one or more exact match models of the plurality of exact match models of the hierarchical string matching machine learning framework, performs a required number of exact match iterations for the input string to generate an exact match determination (e.g., affirmative exact match determination or negative exact match determination) for the input string with respect to one or more exact target strings, where each exact match iteration of the required number of exact match iterations is associated with a particular exact match model of the plurality of exact match models. For example, in some embodiments, each exact match iteration of the required number of exact match iterations may be performed using a particular exact match model of the plurality of exact match models. An affirmative exact match determination may describe output of a given exact match iteration, where the corresponding exact match model generates output indicative that the input string exactly matches at least one of the keyword strings associated with the particular exact model. A negative exact match determination may describe output of an exact match iteration, where the corresponding exact match model generates output indicative that the input string does not exactly match any of the keyword strings associated with the particular exact model.

In some embodiments, the plurality of exact match models may be associated with an exact match model order, where the initial exact match model in the exact match model order may be associated with the initial exact match iteration of the required number of exact match iterations, such that the initial exact match iteration is performed utilizing the initial exact match model in the exact match model order. In some embodiments, the initial exact match model in the exact match model order corresponds to the initial match model (e.g., first match model) of the hierarchical string matching machine learning framework. Accordingly, in some embodiments, generating the database mapping prediction for the input string may comprise activating at least the initial exact match model in the exact match model order. In some embodiments, for each non-initial exact match model of the plurality of exact match models, the non-initial exact match model may be activated based at least in part on the exact match determination (e.g., affirmative match determination or negative match determination) of the immediately preceding exact match model in the exact match model order. For example, each non-initial exact match model in the exact match model order may be activated in response to determining that the immediately preceding exact match model in the exact match model order is activated and is associated with a negative exact match determination. For example, in some embodiments, each non-initial ith exact match model in the exact match model order may be activated in response to determining that the (i−1)th exact model in the exact match model order is activated and associated with a negative exact match determination. As such, in some embodiments, performing a required number of exact match iterations comprises performing a required number of exact match iterations until (i) an affirmative match determination is generated by an activated exact match model or (ii) each of the plurality of exact match models of the plurality of exact match models has been activated (e.g., utilized in performing an exact match iteration).

Figure 8:
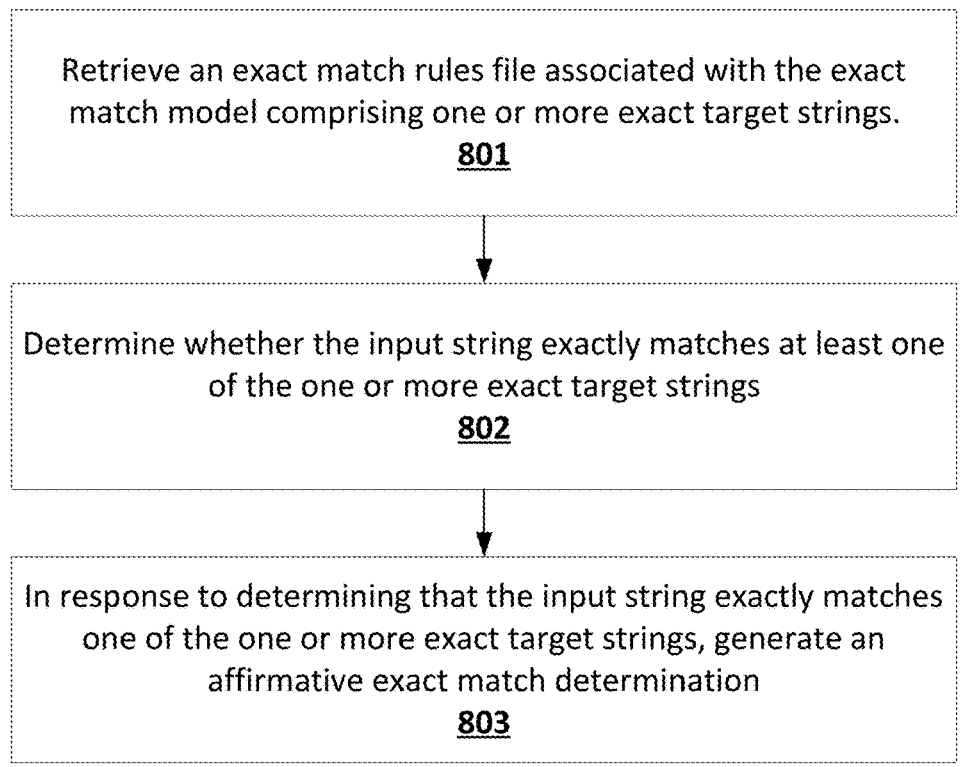
FIG. 8 provides a flowchart diagram of an example process for performing an exact match iteration in accordance with some embodiments discussed herein.

In some embodiments, the process/operation 701 may be performed in accordance with the process 800 depicted in FIG. 8, which is an example process for performing an exact match iteration utilizing a particular exact match model, where the predictive data mapping computing entity 106 may cause the example process depicted in FIG. 8 to be performed. The process depicted in FIG. 8 begins at step/operation 801 when, for a particular exact match model (e.g., activated exact match model), the particular exact model retrieves an exact match rules file associated with the exact match model. As described above, an exact match rules file may describe one or more exact target strings for the exact match model. For example, in some embodiments, an exact match rules file for a particular exact match model may comprise one or more exact target strings, where the one or more exact target strings may comprise one or more keywords (e.g., covid-related keywords such as covid, omicron, and/or the like) with respect to which the input string is matched to determine whether the input string exactly matches at least one of the one or more keywords (e.g., affirmative exact match determination or negative exact match determination).

At step/operation 802, the activated exact match model determines whether the input string exactly matches at least one of the one or more exact target strings. In some embodiments determining whether the input string exactly matches at least one of the one or more exact target strings comprises comparing the input string to the one or more exact target strings. For example, in some embodiments, determining whether the input string exactly matches at least the one or more exact target strings comprises sequentially comparing the input string to the one or more exact target strings until an affirmative exact match determination is generated or the input string has been compared to each of the one or more exact target strings.

At step/operation 803, in response to determining that the input string exactly matches one of the one or more exact target strings, the activated exact match model generates an affirmative exact match determination, where, as described above, an affirmative exact match determination indicates that the input string matches at least one of the one or more exact target strings of the particular exact match model. Additionally, in response to determining that the input string exactly matches one of the one or more exact target strings, the activated exact match model generates a selected mapping label for the input string based at least in part on the mapping label (e.g., carrier type) for the exact match model, where the mapping label for a particular exact match model may describe the mapping label associated with the particular exact model of the plurality of defined mapping labels. In some embodiments, the predictive data mapping computing entity 106 may generate and/or identify other ground-truth data for the input string (e.g., robotic processing automaton instructions) based at least in part on the affirmative exact match determination and/or the mapping label. For example, each exact match model, in addition to the mapping label, may be associated with one or more other ground-truth data (e.g., robotic agent instructions), where in response to determining an affirmative exact match determination, the one or more other ground-truth data may be generated for the input string. As another example, in some embodiments, in response to generating a mapping label for the input string, the one or more ground-truth data may be generated based at least in part on the mapping label, where the one or more ground-truth data may be associated with the mapping label. In response to determining that input string does not exactly match any of the one or more exact strings, the activated exact match model generates a negative exact match determination, where a negative exact match determination indicates that the input string does not exactly match any of the keyword strings associated with the corresponding exact match model.

In some embodiments, prior to performing step/operation 701, the predictive data mapping computing entity 106, using one or more exact matching techniques (e.g., utilizing a machine learning model), may perform row-wise exact match operation with respect to the input string and the ground-truth database table, where the row-wise exact match operation may comprise comparing the input string to the group of row-wise strings in order to determine whether a row-wise string of the group of row-wise strings exactly matches the input string. In some embodiments, the group of row-wise strings may be associated with a row-wise string order (e.g., ground-truth database table row order), and the row-wise exact match operation may comprise sequentially comparing each row-wise string in the group of row-wise strings to the input string based at least in part on the position of the row-wise string in the row-wise string order until: (i) an affirmative row-wise exact match determination is generated (e.g., row-wise string is determined to exactly match the input string, and thus matched to the ground-truth database table row associated with the determined matched row-wise string); or (ii) each row-wise string of the group of row-wise strings has been compared to the input string without an affirmative row-wise exact match determination (thus, negative row-wise exact match determination). An affirmative row-wise exact match determination may describe a determination that a row-wise string of the group of row-wise strings of the ground-truth database table exactly matches the input string, and a negative row-wise exact match determination may describe a determination that none of the row-wise strings of the group of row-wise strings of the ground-truth database table exactly match the input string.

In some embodiments, in response to determining an affirmative row-wise exact match determination, the ground-truth database table row associated with the matched row-wise string may be matched to the input string. In some embodiments, in response to determining an affirmative row-wise exact match and/or matching the input string to the corresponding ground-truth database table row associated with matched row wise string, a selected mapping label (e.g., entity type/carrier type) is generated for the input string based at least in part on the mapping label associated with the matched ground-truth database table row, where the selected mapping label may be utilized to perform one or more prediction-based actions. In some embodiments, the selected mapping label may describe (e.g., may be) the mapping label (e.g., carrier type) associated with the mapped ground-truth database table row.

Returning to FIG. 7 at step/operation 702, in response to determining that each exact match model of the hierarchical string matching learning framework is associated with a negative exact match model determination with respect to the input string, the predictive data mapping computing entity 106, utilizing one or more probabilistic match models of the plurality of probabilistic match models of the hierarchical string matching machine learning framework, performs a required number of probabilistic match iterations for the input string to generate a probabilistic match determination with respect to each probabilistic match iteration, where each respective probabilistic match iteration of the required number of probabilistic match iterations may be associated with a particular probabilistic match model of the plurality of probabilistic match models. For example, in various embodiments, each probabilistic match iteration of the required number of probabilistic match iterations for the input string may be performed using a particular probabilistic match model of the plurality of exact match models. In some embodiments, each probabilistic match iteration is performed based at least in part on the input string and one or more probabilistic target strings for the probabilistic match model.

In some embodiments, the plurality of probabilistic match models may be associated with a probabilistic match model order, where the initial probabilistic match model in the probabilistic match model order may be associated with the initial probabilistic match iteration of the required number of probabilistic match iterations, such that the initial probabilistic match iteration is performed utilizing the initial probabilistic match model in the probabilistic match model order. In some embodiments, the initial probabilistic match model in the probabilistic match model order is activated in response to determining that each exact match model is associated with a negative exact match determination. In some embodiments, for each non-initial probabilistic match model of the plurality of probabilistic match models, the non-initial probabilistic match model may be activated based at least in part on the probabilistic match determination (e.g., affirmative probabilistic match determination or negative probabilistic match determination) of the immediately preceding probabilistic match model in the probabilistic match model order. For example, each non-initial probabilistic match model in the probabilistic match model order may be activated in response to determining that the immediately preceding probabilistic match model in the probabilistic match model order is activated and is associated with a negative probabilistic match determination. For example, in the noted example embodiments, each non-initial ith probabilistic match model in the probabilistic match model order may be activated in response to determining that the (i−1)th probabilistic match model in the probabilistic match model order is activated and associated with a negative probabilistic match determination. As such, in some embodiments, performing a required number of probabilistic match iterations comprises performing a required number of probabilistic match iterations until (i) an affirmative probabilistic determination is generated by an activated probabilistic match model or (ii) each of the plurality of probabilistic match models of the plurality of probabilistic match models has been activated (e.g., utilized in performing a probabilistic match iteration). In some embodiments, the probabilistic match models may utilize fuzzy match technique for generating the probabilistic match determination, where the probabilistic match model is configured to generate a pairwise fuzzy match score for the input string with respect to each of the one or more probabilistic target strings. In some embodiments, the pairwise fuzzy match score may be determined utilizing a fuzzy match score generation technique (e.g., string approximation algorithm, and/or other suitable fuzzy match score generation techniques).

In some embodiments, the process/operation 702 may be performed in accordance with the process 900 depicted in FIG. 9, which is an example process for performing a probabilistic match model iteration with respect to a particular probabilistic match model (e.g., activated probabilistic match model), where the predictive data mapping computing entity 106 may cause the example process depicted in FIG. 9 to be performed. The process depicted in FIG. 9 begins at step/operation 901 when the activated probabilistic match model retrieves a probabilistic match rules file associated with the probabilistic match model. A probabilistic match rules file may describe one or more probabilistic target strings for the probabilistic match model. For example, in some embodiments, a probabilistic match rules file for a particular probabilistic match model may comprise one or more probabilistic target strings, where the one or more probabilistic target strings may comprise one or more keywords with respect to which the input string is compared to determine whether the input string matches the respective keyword. For example, in some embodiments, a first probabilistic match model may be associated with a probabilistic match rules file that comprises Medicare and/or Medicaid keywords, and a second probabilistic match model may be associate with a probabilistic match rules file that comprises Marketplace and/or Exchange keywords. Additionally, in some embodiments, the probabilistic match rules file may describe an optimized probabilistic match threshold for the probabilistic match model (as described above).

At step/operation 902, for each probabilistic target string, the activated probabilistic match model generates a respective pairwise fuzzy match score with respect to the input string. For example, in some embodiments, the probabilistic match model may generate a plurality of pairwise fuzzy match scores with respect to the input string, where each pairwise fuzzy match score of the plurality of pairwise fuzzy match scores is generated based at least in part on a particular probabilistic target string and the input string (thus, a given pairwise fuzzy score is associated with the particular probabilistic target string).

At step/operation 903, the activated probabilistic match model determines whether at least one respective pairwise fuzzy match score satisfies the optimized probabilistic match threshold (as described above) for the probabilistic match model At step/operation 904, the activated probabilistic match model, in response to determining that at least one respective pairwise fuzzy match score satisfies the optimized probabilistic match threshold for the probabilistic match model, generates an affirmative probabilistic match determination, where an affirmative probabilistic match determination indicates that the input string matches at least one of the probabilistic target strings based at least in part on the optimized probabilistic match threshold for the corresponding probabilistic match model. Additionally, in some embodiments, in response to determining that at least one respective pairwise fuzzy match score satisfies the optimized probabilistic match threshold for the probabilistic match model, the activated probabilistic match model generates predicted ground-truth data that includes selected mapping label for the input string based at least in part on the mapping label for the activated probabilistic match model, where the selected mapping label may be utilized to perform one or more prediction-based actions. In some embodiments, the selected mapping label may describe (e.g., may be) the mapping label (e.g., carrier type) associated with the mapped ground-truth database table row. In some embodiments, the predicted ground-truth data may include other data such as robotic process automation (e.g., robotic agent) instructions.

Figure 10:
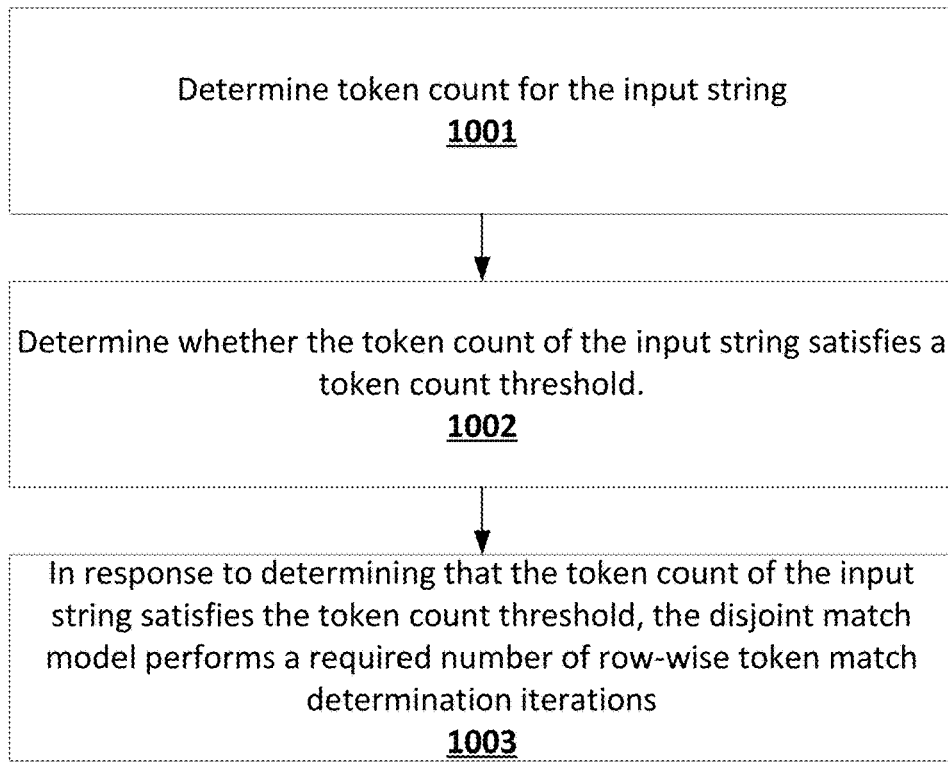
FIG. 10 provides a flowchart diagram of an example process for generating a disjoint match determination for an input string in accordance with some embodiments discussed herein.

Returning to FIG. 7 at step/operation 703, in response to determining that each probabilistic match model of the hierarchical string matching learning framework is associated with a negative probabilistic match determination with respect to the input string, the predictive data mapping computing entity 106, utilizing a disjoint match model of the hierarchical string matching machine learning framework, processes the input string to generate a disjoint match determination with respect to the input string, where a disjoint match determination may be configured to describe whether the input string maps to a row in the ground-truth database table or does not map to a row in the ground-truth database table. In some embodiments, the process/operation 703 may be performed in accordance with the process 1000 depicted in FIG. 10, which is an example process for generating a disjoint match determination utilizing a disjoint match model, where the predictive data mapping computing entity 106 may cause the example process depicted in FIG. 10 to be performed. The process that is depicted in FIG. 10 begins at step/operation 1001 when the disjoint match model determines the token count (e.g., word-level token count) for the input string. In some embodiments, determining the token count for the input string may comprise splitting the input string into its corresponding tokens and determining a count of the tokens.

At step/operation 1002, the disjoint match model utilizing the disjoint match model determines whether the token count of the input string satisfies a token count threshold. For example, in some embodiments, the token count threshold may be three, where an input string having a token count of less than three is determined to be associated with a non-token count threshold satisfying input string (e.g., fails to satisfy the token count threshold). It should be understood that while the token count threshold in the noted example embodiment may be three, the token count may be less than three or greater than three in other embodiments.

At step/operation 1003, in response to determining that the token count of the input string fails to satisfy the token count threshold, the disjoint match model generates a negative disjoint match determination. In response to determining that the token count of the input string satisfies the token count threshold, the disjoint match model performs a required number of row-wise token match determination iterations, where each ith row-wise token match determination iteration is associated with an ith row-wise string of the group of row-wise strings that is selected in accordance with a row order for the group of ground-truth database table rows in the ground-truth database table. In some embodiments, an ith row-wise token match determination iteration comprises determining whether a threshold number of non-stop-word tokens of the input string exactly match with the ith row-wise string. In some embodiments, the disjoint match model removes (e.g., filters) stop-word-tokens present in the input string prior to performing the required number of row-wise token match determination iterations.

In some embodiments performing a required number of row-wise token match determination iterations comprises performing a required number of row-wise token match determination iterations until an earlier-satisfied condition of: (a) reaching a qualifying row-wise token match determination iteration that is associated with a qualifying row-wise string whose qualifying token match score with respect to the input string satisfies a qualifying token match score threshold, or (b) reaching a final row-wise token match determination iteration that is associated with a final row-wise string of the group of row-wise strings. As such, in some embodiments, a qualifying row-wise token match determination iteration describes an iteration where a threshold number of non-stop-word tokens of the input string are exactly matched with the ith row-wise string.

In some embodiments, the disjoint match model generates a token match score for a given row-wise string with respect to the input string, where the token match score may describe the number of tokens in the row-wise string that are matched to the non-stop-word tokens of the input string. A qualifying row-wise string describes a row-wise string whose token match score satisfies the qualifying token match score threshold. Moreover, a qualifying row-wise token match determination iteration describes the row-wise token match determination iteration with respect to which the qualifying row-wise string was determined. For example, consider where the qualifying token match score threshold is two (2), In the noted example, if at least two non-stop-word tokens of the input string are matched to a particular row-wise string, the particular row-wise string is determined to be a qualifying row-wise string and the associated row-wise token match determination iteration is determined to be a qualifying row-wise token match determination iteration. It should be understood that while the qualifying token match score threshold in the above example may be two, the qualifying token match score threshold may be less than two or more than two in other embodiments.

In some embodiments, in response to reaching the qualifying row-wise token match determination iteration, the disjoint match model generates predicted ground-truth data for the input string, where the predicted ground-truth data corresponds to the ground-truth data field of the ground-truth database table row that is associated with the qualifying row-wise string. In some embodiments, the predicted ground-truth data includes a selected mapping label for the input string based at least in part on the row-wise mapping label for the qualifying row-wise string (e.g., mapping label associated with the ground-truth database table row associated with the qualifying row-wise string). Additionally and/or alternatively, in response to reaching the qualifying row-wise token match determination iteration, the disjoint match model generates an affirmative disjoint match determination. In some embodiments, in response to reaching a final row-wise token match determination iteration, where the final row-wise token match determination iteration is associated with a non-qualifying row-wise token match determination iteration that is associated with a non-qualifying row-wise string (e.g., whose qualifying token match score with respect to the input string fails to satisfy the qualifying token match score threshold), the disjoint match model generates a negative disjoint match determination.

Returning to FIG. 7 at step/operation 704, in response to determining that disjoint match model of the hierarchical string matching learning framework is associated with a negative disjoint match model determination with respect to the input string, the predictive data mapping computing entity 106, utilizing an embedding-based match model of the hierarchical string matching machine learning framework, generates an embedding-based match determination, where an embedding-based match determination may be configured to describe whether the input string maps to a row in the ground-truth database table based at least in part on an embedding vector for the input string and a group of row-wise string embedding vectors.

Figure 11:
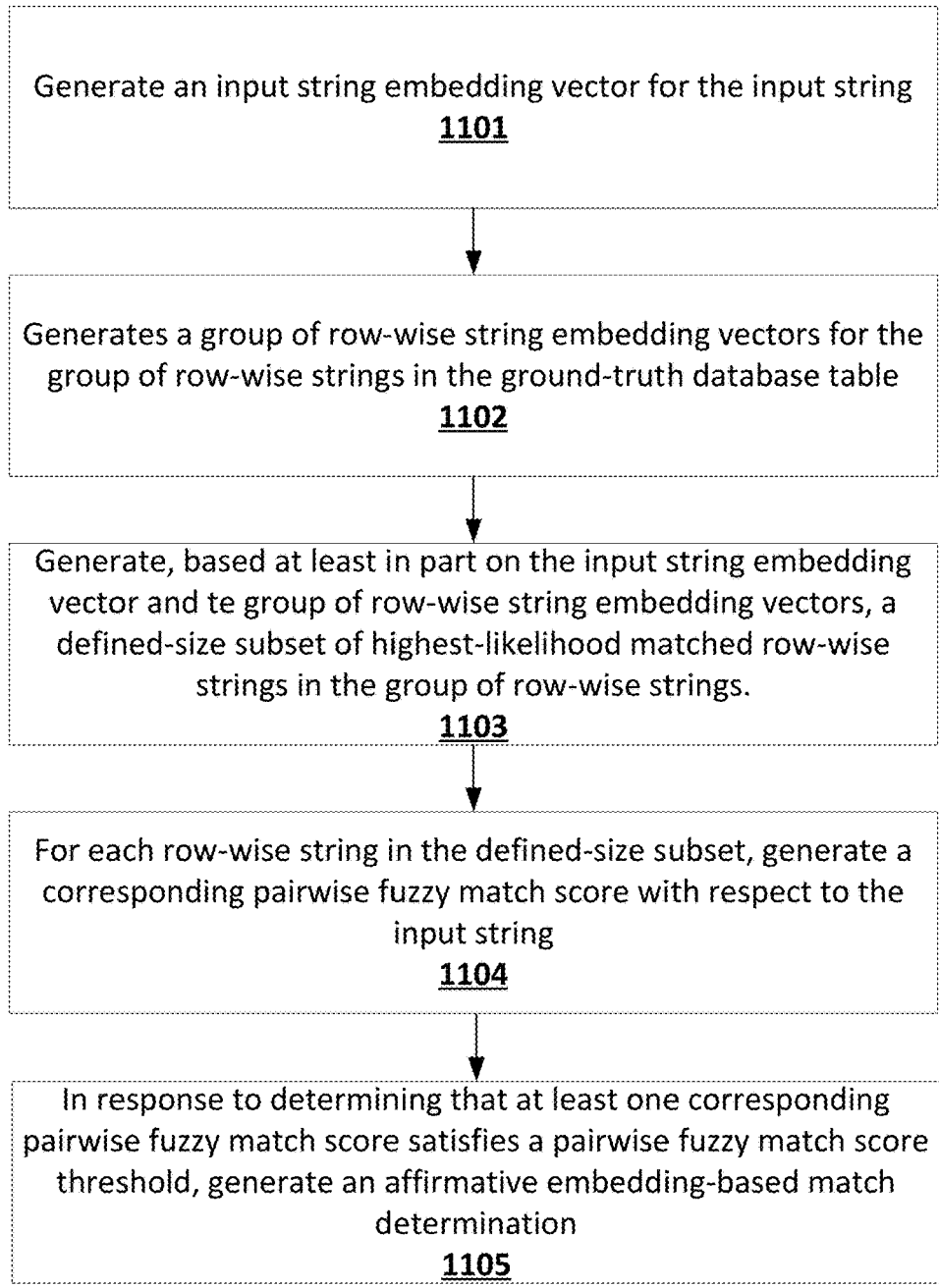
FIG. 11 provides a flowchart diagram of an example process for generating an embedding-based match determination for an input string in accordance with some embodiments discussed herein.

In some embodiments, the step/operation 704 may be performed in accordance with the process 1100 that is depicted in FIG. 11, which is an example process for generating an embedding-based match determination for an input string utilizing an embedding-based match model, where the predictive data mapping computing entity 106 may cause the example process depicted in FIG. 11 to be performed. The process 1100 that is depicted in FIG. 11 begins at step/operation 1101 when the embedding-based matching model generates an input string embedding vector for the input string.

At step/operation 1102, the embedding-based matching model generates a group of row-wise string embedding vectors for the group of row-wise strings in the ground-truth database table.

At step/operation 1103, the embedding based model generates, based at least in part on the input string embedding vector for the input string and a group of row-wise string embedding vectors for the group of row-wise strings, a defined-size subset of highest-likelihood matched row-wise strings in the group of row-wise strings. In some embodiments, the defined-size subset of highest-likelihood matched row-wise strings may be generated utilizing Facebook AI Similarity Search (FATS S) library, where the FAISS similarity matching may be performed using the distribution of alphabetical characters in the input string. In some embodiments the size of the defined-size subset of highest-likelihood matched row-wise strings in the group of row-wise strings may be 200. It should be noted, however, that the size of the defined-size subset of highest-likelihood matched row-wise strings in the group of row-wise strings may be less than 200 or greater than 200 in some embodiments.

In some embodiments to generate the optimal preselection size of the defined-size subset of the group of row-wise strings, a plurality of candidate preselection sizes are identified, and for each candidate preselection size of a plurality of candidate preselection sizes, an experimental accuracy ratio is generated based at least in part on a ratio of candidate defined-size subsets, where the candidate defined-size subsets are generated in accordance with the candidate preselection size and based at least in part on experimentation data that comprise ground-truth row-wise strings associated with the experimentation data. In the noted embodiment, the optimal preselection size is then generated based at least in part on each experimental accuracy ratio. In some embodiments, generating the optimal preselection size based at least in part on each experimental accuracy ratio comprises generating the optimal preselection size based at least in part on a lowest candidate preselection size whose experimental accuracy ratio satisfies an experimental accuracy ratio threshold.

At step/operation 1104, for each row-wise string in the defined-size subset, the embedding-based match model, generates a corresponding pairwise fuzzy match score with respect to the input string. At step/operation 1105, in response to determining that at least one corresponding pairwise fuzzy match score satisfies a pairwise fuzzy match score threshold, the embedding-based match model generates an affirmative embedding-based match determination. Additionally, in some embodiments, in response to determining that at least one corresponding pairwise fuzzy match score satisfies a pairwise fuzzy match score threshold, the embedding based-match model generates predicted ground-truth data that includes a mapping label, where the predicted ground-truth data corresponds to the ground-truth data fields of the ground-truth database table row associated with row-wise string in the defined-size subset that is associated with the highest corresponding pairwise fuzzy match score. Accordingly, in some embodiments, the selected mapping label may correspond to the row-wise mapping label (e.g., mapping label for the row-wise string in the defined-size subset that is associated with the highest corresponding pairwise fuzzy match score).

Returning to FIG. 4, at step/operation 402, the predictive data mapping computing entity 106 generates the database mapping prediction based at least in part on at least one of the selected mapping labels for the input string or a negative embedding-based determination.

At step/operation 403, the predictive data mapping computing entity 106 performs one or more prediction-based actions based at least in part on the database mapping prediction. As noted above, in some embodiments, a defined mapping label may be identified for the input string from a plurality of defined mapping labels. In some embodiments, the plurality of defined mapping labels may comprise one or more redirecting mapping labels. For example, in some embodiments, performing the one or more prediction-based actions may comprise, in response to determining that the selected mapping label is a redirecting mapping label, performing one or more application programming interface (API) call operations with respect to an API of the redirecting mapping label. For example, in a COB context a commercial carrier type may describe a redirection mapping label, where in response to determining that the carrier type for the matched ground-truth data with respect to the input string is a commercial carrier type, the predictive data mapping computing entity provides one or more ground-truth data (e.g., carrier name, instructions for robotic agents associated with the COB process, and/or the like).

In some embodiments, performing the prediction-based actions comprises generating user interface data for a prediction output user interface that displays one or more of the input string, the matched row-wise string, matched keyword string, a portion (e.g., all) of the predicted ground-truth data, and confidence score associated with the predicted ground-truth data. An operational example of such a prediction output user interface 1200 is depicted in FIG. 12. As shown in FIG. 12 the user interface may be configured to display the input string 1202 that describes the free-text carrier name variation string or non-carrier-name suggesting string, carrier type 1204 that describes the carrier class/category for the input string, carrier API 1206 that describes the standardized carrier name, other insurance carrier 1208 that describes the row-wise string insurance carrier name (or keyword string) matched to the input string, and confidence score 1210 that describes the confidence level that the input string and the matched row-wise string (or keyword string) are a match.

An example of a prediction-based action that can be performed in accordance with various embodiments of the present invention relates to performing automated operational load balancing operations for post-prediction systems by using string-based prediction outputs to set the number of allowed computing entities used by the noted post-prediction systems and thus perform operational load balancing for the post-prediction systems (e.g., for investigation systems that use string-based prediction outputs as inputs to their investigative operations). For example, in some embodiments, a predictive data analysis computing entity (e.g., a predictive data mapping computing entity) determines D string-based predicted scores for the D input strings. Then, the count of D input strings, along with a resource utilization ratio for each input string, can be used to predict a number of computing entities needed to perform post-prediction processing operations (e.g., automated investigation operations) with respect to the D input strings. For example, in some embodiments, the number of computing entities needed to perform post-prediction processing operations (e.g., automated investigation operations) with respect to D input strings can be determined based at least in part on the output of the equation: $R=\text{ceil}(\Sigma_k^{k=K} ur_k)$, where R is the predicted number of computing entities needed to perform post-prediction processing operations with respect to the D input strings, ceil(.) is a ceiling function that returns the closest integer that is greater than or equal to the value provided as the input parameter of the ceiling function, k is an index variable that iterates over K input strings among the D input strings that are associated with the highest predicted scores, and $ur_k$ is the estimated resource utilization ratio for a kth input string. In some embodiments, once R is generated, a predictive data analysis computing entity (e.g., a predictive data mapping computing entity) can use R to perform operational load balancing for a server system that is configured to perform post-prediction processing operations (e.g., investigation operations) with respect to D input strings. This may be done by allocating computing entities to the post-prediction processing operations if the number of currently-allocated computing entities is below R, and deallocating currently-allocated computing entities if the number of currently-allocated computing entities is above R.

As described below, various embodiments of the present disclosure make important technical contributions to improving predictive accuracy of string-based machine learning models by introducing innovative machine learning techniques that enable using trained models in combination with rule-based techniques in a manner that is configured to improve training speed and training efficiency of string-based machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, the techniques described herein improve predictive accuracy without harming training speed, such as various techniques described herein, enable improving training speed given a constant predictive accuracy. In doing so, the techniques described herein improve accuracy, efficiency, and speed of machine learning models, thus reducing the number of computational operations needed and/or the amount of training data entries needed to train string-based machine learning models. Accordingly, the techniques described herein improve at least one of the computational efficiency, storage-wise efficiency, and speed of training machine learning models.

Moreover, various embodiments of the present invention improve computational efficiency of performing string-based machine learning models by introducing techniques that limit the use of trained string-input machine learning models to instances where less computationally-expensive rule-based model operations fail to generate a satisfactory match. For example, various embodiments of the present invention introduce a hierarchical string matching machine learning framework that comprises a group of table-independent match models and a plurality of table-dependent match models, where the group of table-independent match models comprise a plurality of exact match models and a plurality of probabilistic match models, the plurality of table-dependent match models comprises a disjoint match model and an embedding-based match model, and each table-independent match model is associated with a respective mapping label of a plurality of defined mapping labels, each probabilistic match model is triggered in response to determining that each exact match model is associated with a negative exact match determination, the disjoint match model is triggered in response to determining that each probabilistic match model is associated with a negative probabilistic match determination, and the embedding-based match model (which in some embodiments is the component that uses one or more machine learning operations) is triggered in response to determining that the disjoint match model is associated with a negative disjoint match determination. In this way, the noted embodiments of the present invention limit the use of trained string-input machine learning models to instances where less computationally-expensive rule-based model operations fail to generate a satisfactory match, an approach that in turn improves computational efficiency of performing string-based machine learning models.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   generating, by one or more processors and for an input string, at least a first mapping label associated with one or more of a plurality of table-independent match models and a second mapping label associated with one or more of a plurality of table-dependent match models, wherein (i) the plurality of table-independent match models comprises a disjoint match model and an embedding-based match model, and (ii) the disjoint match model is triggered responsive to determining that each probabilistic match model of the plurality of table-dependent match models is associated with a negative probabilistic match determination;

generating, by the one or more processors, a database mapping prediction based at least in part on the first mapping label or the second mapping label; and initiating, by the one or more processors, the performance of one or more prediction-based actions based at least in part on the database mapping prediction.

2. The computer-implemented method of claim 1, wherein:

the plurality of table-independent match models comprises a plurality of exact match models and a plurality of probabilistic match models, the plurality of exact match models is associated with an exact match model order, and each non-initial ith exact match model in the exact match model order is activated responsive to determining that an (i−1)th exact match model in the exact match model order is activated and associated with a negative exact match determination.

3. The computer-implemented method of claim 1, wherein:

the plurality of table-independent match models comprises a plurality of exact match models and a plurality of probabilistic match models, the plurality of probabilistic match models is associated with a probabilistic match model order, an initial probabilistic match model in the probabilistic match model order is activated responsive to determining that each exact match model is associated with a negative exact match determination, and each non-initial ith probabilistic match in the probabilistic match model order is activated responsive to determining that an (i−1)th probabilistic match model in the probabilistic match model order is activated and associated with the negative probabilistic match determination.

4. The computer-implemented method of claim 1, wherein:

one of the first mapping label or the second mapping label comprises one or more redirecting mapping labels, and initiating the performance of the one or more prediction-based actions comprises:

responsive to determining that the first mapping label or second mapping label is a redirecting mapping label, performing one or more application programming interface (API) call operations with respect to an API of the redirecting mapping label.

5. The computer-implemented method of claim 2, further comprising:

generating, by the one or more processors, an optimized probabilistic match threshold for a particular probabilistic match model among the plurality of probabilistic match models by:

identifying a user-selected selection success ratio hyper-parameter for a respective mapping label that is associated with the particular probabilistic match model;

detecting, based at least in part on experimentation data associated with the particular probabilistic match model, a lowest qualifying probabilistic match threshold that satisfies a selection outcome defined by a user-selected selection success ratio hyper-parameter; and generating the optimized probabilistic match threshold based at least in part on the lowest qualifying probabilistic match threshold.

6. The computer-implemented method of claim 1, further comprising:

generating, by the one or more processors, an optimal preselection size of a defined-size subset of a plurality of row-wise strings by:

for each candidate preselection size of a plurality of candidate preselection sizes, generating an experimental accuracy ratio based at least in part on a ratio of candidate defined-size subsets generated in accordance with the candidate preselection size and based at least in part on experimentation data that comprise ground-truth row-wise strings associated with the experimentation data; and generating the optimal preselection size based at least in part on each experimental accuracy ratio.

7. The computer-implemented method of claim 6, further comprising:

generating, by the one or more processors, the optimal preselection size based at least in part on each experimental accuracy ratio by generating the optimal preselection size based at least in part on a lowest candidate preselection size whose experimental accuracy ratio satisfies an experimental accuracy ratio threshold.

8. A system comprising memory and one or more processors configured to:

generate, for an input string, at least a first mapping label associated with one or more of a plurality of table-independent match models and a second mapping label associated with one or more of a plurality of table-dependent match models, wherein the plurality of table-dependent match models comprises a disjoint match model and an embedding-based match model, and the disjoint match model is triggered responsive to determining that each probabilistic match model of the plurality of table-dependent match models is associated with a negative probabilistic match determination generate a database mapping prediction based at least in part on the first mapping label or the second mapping label; and initiate the performance of one or more prediction-based actions based at least in part on the database mapping prediction.

9. The system of claim 8, wherein:

the plurality of table-independent match models comprises a plurality of exact match models and a plurality of probabilistic match models, the plurality of exact match models is associated with an exact match model order, and each non-initial ith exact match model in the exact match model order is activated responsive to determining that an (i−1)th exact match model in the exact match model order is activated and associated with a negative exact match determination.

10. The system of claim 8, wherein:

the plurality of table-independent match models comprises a plurality of exact match models and a plurality of probabilistic match models, the plurality of probabilistic match models associated with a probabilistic match model order, an initial probabilistic match model in the probabilistic match model order is activated responsive to determining that each exact match model is associated with a negative exact match determination, and each non-initial ith probabilistic match in the probabilistic match model order is activated responsive to determining that an (i−1)th probabilistic match model in the probabilistic match model order is activated and associated with the negative probabilistic match determination.

11. The system of claim 8, wherein:
one of the first mapping label or the second mapping label comprises one or more redirecting mapping labels, and
initiating the performance of the one or more prediction-based actions comprises:
responsive to determining that the first mapping label or second mapping label is a redirecting mapping label, performing one or more application programming interface (API) call operations with respect to an API of the redirecting mapping label.

12. The system of claim 9, wherein the one or more processors are further configured to generate an optimized probabilistic match threshold for a particular probabilistic match model by:
identifying a user-selected selection success ratio hyper-parameter for a respective mapping label that is associated with the particular probabilistic match model;
detecting, based at least in part on experimentation data associated with the particular probabilistic match model, a lowest qualifying probabilistic match threshold that satisfies a selection outcome defined by the user-selected selection success ratio hyper-parameter; and
generating the optimized probabilistic match threshold based at least in part on the lowest qualifying probabilistic match threshold.

13. The system of claim 8, wherein the one or more processors are further configured to generate an optimal preselection size of a defined-size subset of a plurality of row wise strings by:
for each candidate preselection size of a plurality of candidate preselection sizes, generating an experimental accuracy ratio based at least in part on a ratio of candidate defined-size subsets generated in accordance with the candidate preselection size and based at least in part on experimentation data that comprise ground-truth row-wise strings associated with the experimentation data; and
generating the optimal preselection size based at least in part on each experimental accuracy ratio.

14. The system of claim 13, wherein the one or more processors are further configured to generate the optimal preselection size based at least in part on each experimental accuracy ratio by generating the optimal preselection size based at least in part on a lowest candidate preselection size whose experimental accuracy ratio satisfies an experimental accuracy ratio threshold.

15. One or more non-transitory computer-readable storage media including instructions that, when executed by one or more processors, cause the one or more processors to:
generate, for an input string, at least a first mapping label associated with one or more of
a plurality of table-independent match models and a second mapping label associated with one or more of a plurality of table-dependent match models,
wherein
the plurality of table-dependent match models comprises a disjoint match model and an embedding-based match model, and
the disjoint match model is triggered responsive to determining that each probabilistic match model of the plurality of table-dependent match models is associated with a negative probabilistic match determination generate a database mapping prediction based at least in part on the first mapping label or the second mapping label; and
initiate the performance of one or more prediction-based actions based at least in part on the database mapping prediction.

16. The one or more non-transitory computer-readable storage media of claim 15, wherein:
the plurality of table-independent match models comprises a plurality of exact match models and a plurality of probabilistic match models,
the plurality of exact match models is associated with an exact match model order, and
each non-initial ith exact match model in the exact match model order is activated responsive to determining that an (i−1)th exact match model in the exact match model order is activated and associated with a negative exact match determination.

17. The one or more non-transitory computer-readable storage media of claim 15, wherein:
the plurality of table-independent match models comprises a plurality of exact match models and a plurality of probabilistic match models,
the plurality of probabilistic match models associated with a probabilistic match model order,
an initial probabilistic match model in the probabilistic match model order is activated responsive to determining that each exact match model is associated with the negative exact match determination, and
each non-initial ith probabilistic match in the probabilistic match model order is activated responsive to determining that an (i−1)th probabilistic match model in the probabilistic match model order is activated and associated with a negative probabilistic match determination.

18. The one or more non-transitory computer-readable storage media of claim 15, wherein:
one of the first mapping label or the second mapping label comprises one or more redirecting mapping labels, and
initiating the performance of the one or more prediction-based actions comprises:
responsive to determining that the first mapping label or second mapping label is a redirecting mapping label, performing one or more application programming interface (API) call operations with respect to an API of the redirecting mapping label.

19. The one or more non-transitory computer-readable storage media of claim 15, wherein the instructions, when executed by one or more processors, further cause the one or more processors to:
generate an optimized probabilistic match threshold for a particular probabilistic match model by:
identifying a user-selected selection success ratio hyper-parameter for a respective mapping label that is associated with the particular probabilistic match model;
detecting, based at least in part on experimentation data associated with the particular probabilistic match model, a lowest qualifying probabilistic match threshold that satisfies a selection outcome defined by the user-selected selection success ratio hyper-parameter; and
generating the optimized probabilistic match threshold based at least in part on the lowest qualifying probabilistic match threshold.

20. The one or more non-transitory computer-readable storage media of claim 15, wherein the instructions, when executed by one or more processors, further cause the one or more processors to:
 generate an optimal preselection size of a defined-size subset of a plurality of row- wise strings by:
  for each candidate preselection size of a plurality of candidate preselection sizes, generating an experimental accuracy ratio based at least in part on a ratio of candidate defined-size subsets generated in accordance with the candidate preselection size and based at least in part on experimentation data that comprise ground-truth row-wise strings associated with the experimentation data; and
  generating the optimal preselection size based at least in part on each experimental accuracy ratio.

\* \* \* \* \*